US012354194B2

(12) United States Patent
Turgutlu et al.

(10) Patent No.: US 12,354,194 B2
(45) Date of Patent: Jul. 8, 2025

(54) NEURAL IMAGE COMPOSITING WITH LAYOUT TRANSFORMERS

(71) Applicant: ADOBE INC., San Jose, CA (US)

(72) Inventors: Kerem Can Turgutlu, Palo Alto, CA (US); Sanat Sharma, Austin, TX (US); Jayant Kumar, San Jose, CA (US); Rohith Mohan Dodle, San Jose, CA (US); Vipul Dalal, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 576 days.

(21) Appl. No.: 17/652,512

(22) Filed: Feb. 25, 2022

(65) Prior Publication Data

US 2023/0274478 A1     Aug. 31, 2023

(51) Int. Cl.
*G06T 11/60*     (2006.01)
*G06V 10/764*    (2022.01)
(Continued)

(52) U.S. Cl.
CPC ............ *G06T 11/60* (2013.01); *G06V 10/764* (2022.01); *G06V 10/774* (2022.01); *G06V 10/82* (2022.01);
(Continued)

(58) Field of Classification Search
CPC . G06T 11/60; G06T 2210/12; G06T 2210/61; G06T 11/00; G06T 2207/20081; G06T 2207/20084; G06T 2207/20221; G06V 10/764; G06V 10/774; G06V 10/82; G06V 20/70; G06V 10/454; G06V 20/36; G06V 10/26; G06V 20/35; G06N 3/08; G06N 3/084; G06N 3/02
See application file for complete search history.

(56) References Cited

U.S. PATENT DOCUMENTS

2020/0074707 A1     3/2020  Lee et al.
2022/0292685 A1*    9/2022  Heisler ............... G06T 7/11

FOREIGN PATENT DOCUMENTS

GB        2613240      5/2023
WO      2023049726     3/2023

OTHER PUBLICATIONS

C. Yang, W. Fan, F. Yang and Y. F. Wang, "LayoutTransformer: Scene Layout Generation with Conceptual and Spatial Diversity," in 2021 IEEE/CVF Conference on Computer Vision and Pattern Recognition (CVPR), Nashville, TN, USA, 2021, pp. 3731-3740 (Year: 2021).*

(Continued)

*Primary Examiner* — Said Broome
*Assistant Examiner* — Andrew Shin
(74) *Attorney, Agent, or Firm* — F. CHAU & ASSOCIATES, LLC

(57) ABSTRACT

Systems and methods for image processing are described. Embodiments of the present disclosure receive an image depicting an object; generate a sequence of tokens including a set of tokens corresponding to the object and a set of mask tokens corresponding to an additional object to be inserted into the image; generate a placement token value for the set of mask tokens based on the sequence of tokens using a sequence encoder, wherein the placement token value represents position information of the additional object; and insert the additional object into the image based on the position information to obtain a composite image.

17 Claims, 12 Drawing Sheets

(51) Int. Cl.
*G06V 10/774* (2022.01)
*G06V 10/82* (2022.01)
*G06V 20/70* (2022.01)

(52) U.S. Cl.
CPC .......... *G06V 20/70* (2022.01); *G06T 2210/12* (2013.01); *G06T 2210/61* (2013.01)

(56) References Cited

OTHER PUBLICATIONS

Combined Search and Examination Report dated Jun. 14, 2023 in corresponding Great Britain Application No. GB2218376.8 (5 pages).
Devlin, et al., "BERT: Pre-training of Deep Bidirectional Transformers for Language Understanding", arXiv preprint arXiv:1810.04805v2 [cs.CL] May 24, 2019, 16 pages.
Gupta, et al., "LayoutTransformer: Layout Generation and Completion with Self-attention", In Proceedings of the IEEE/CVF International Conference on Computer Vision, pp. 1004-1014, 2021.
Kirillov, et al., "Panoptic Segmentation", In Proceedings of the IEEE/CVF Conference on Computer Vision and Pattern Recognition, pp. 9404-9413, 2019.
Lee, et al., "Context-Aware Synthesis and Placement of Object Instances", arXiv preprint arXiv:1812.02350v2 [cs.CV] Dec. 7, 2018, 11 pages.
Radford, et al., "Improving Language Understanding by Generative Pre-Training", 2018, 12 pages.

\* cited by examiner

NEURAL IMAGE COMPOSITING WITH LAYOUT TRANSFORMERS

BACKGROUND

The following relates generally to image processing, and more specifically to image generation using machine learning.

Digital image processing refers to the use of a computer to edit a digital image or synthesize an image using an algorithm or a processing network. Image generation is a subfield in image processing. In some examples, object insertion is based on creating accurate masks for an additional object to be inserted into an image. The masks may be blended using image editing tools such as Adobe® Photoshop. In some cases, a machine learning framework may take an original image and a target object and output a composite image comprising the target object.

However, conventional image generation networks are not able to perform object insertion within an image with appropriate position, scale, harmony, etc. Generated images often look unrealistic and require substantial manual edits from users. Therefore, there is a need in the art for improved image generation systems that can efficiently and accurately perform object insertion within an image.

SUMMARY

The present disclosure describes systems and methods for image generation. Embodiments of the present disclosure include an image generation apparatus configured to insert a new object into an image to obtain a composite image. A sequential encoder is used to determine different pieces of information sequentially, e.g., classification of the new object, x coordinate, y coordinate, height, and width. This enables the inserted object to be placed and scaled appropriately within the image. In some embodiments, a sequence generation component of the image generation apparatus generates a sequence of tokens including a set of tokens corresponding to an existing object and a set of mask tokens corresponding to the new object to be inserted into the image. A sequence encoder of the image generation apparatus generates a placement token value for the set of mask tokens based on the sequence of tokens. The placement token value represents position information of the new object (e.g., coordinates, location, scale). The image generation apparatus inserts the new object into the image based on the position information to obtain a composite image.

A method, apparatus, and non-transitory computer readable medium for image generation are described. One or more embodiments of the method, apparatus, and non-transitory computer readable medium include receiving an image depicting an object; generating a sequence of tokens including a set of tokens corresponding to the object and a set of mask tokens corresponding to an additional object to be inserted into the image; generating a placement token value for the set of mask tokens based on the sequence of tokens using a sequence encoder, wherein the placement token value represents position information of the additional object; and inserting the additional object into the image based on the position information to obtain a composite image.

A method, apparatus, and non-transitory computer readable medium for training a neural network are described. One or more embodiments of the method, apparatus, and non-transitory computer readable medium include receiving training data including an image depicting an object and ground truth information about an additional object; generating a sequence of tokens including a set of tokens corresponding to the object and a set of mask tokens corresponding to the additional object; generating a placement token value for the set of mask tokens based on the sequence of tokens using a sequence encoder, wherein the placement token value represents position information of the additional object; comparing the placement token value with the ground truth information; and updating parameters of the sequence encoder based on the comparison of the placement token value with the ground truth information.

An apparatus and method for image generation are described. One or more embodiments of the apparatus and method include a sequence generation component configured to generate a sequence of tokens including a set of tokens corresponding to an object in an image and a set of mask tokens corresponding to an additional object to be inserted into the image; a sequence encoder configured to generate a placement token value for the set of mask tokens based on the sequence of tokens, wherein the placement token value represents position information of the additional object; and an image generation component configured to insert the additional object into the image based on the position information to obtain a composite image.

DETAILED DESCRIPTION

Figure 1:
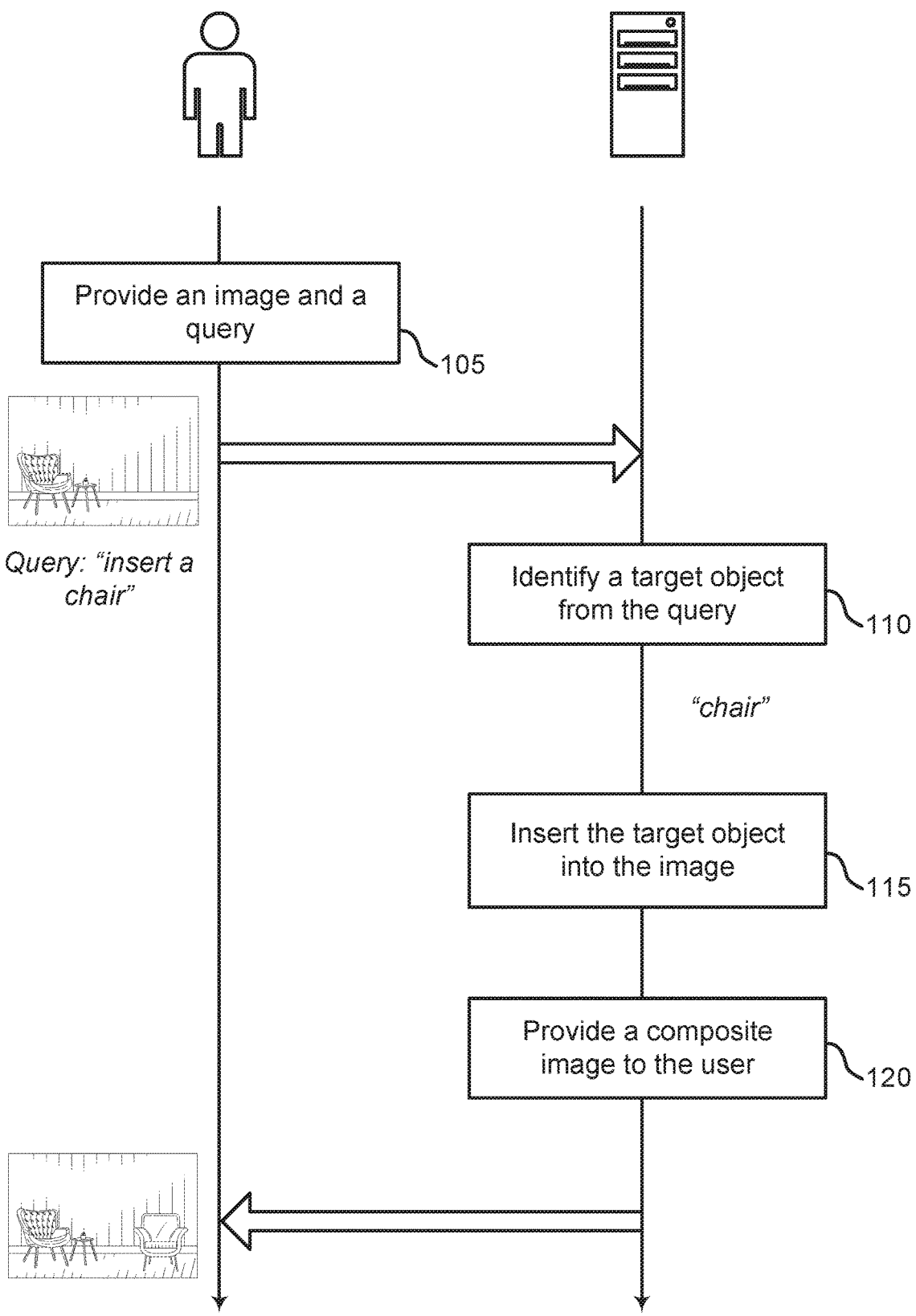
FIG. 1 shows an example of image generation according to aspects of the present disclosure.

The present disclosure describes systems and methods for image generation. Embodiments of the present disclosure include an image generation apparatus configured to insert a new object into an image to obtain a composite image. A sequential encoder is used to determine different pieces of information sequentially, e.g., classification of the new object, x coordinate, y coordinate, height, and width. This enables the inserted object to be placed and scaled appropriately within the image. In some embodiments, a sequence generation component of the image generation apparatus generates a sequence of tokens including a set of tokens corresponding to an existing object and a set of mask tokens corresponding to the new object to be inserted into the image. A sequence encoder of the image generation apparatus generates a placement token value for the set of mask tokens based on the sequence of tokens. The placement token value represents position information of the new object to be inserted (e.g., coordinates, location, scale). The image generation apparatus inserts the new object into the image based on the position information to obtain a composite image.

Image compositing has become increasingly popular when designing photos, posters, and flyers. In some cases, designers begin with a blank canvas, add a base or background image, and add parts from other images while applying geometric and color transformations (i.e., edits) until a target image is obtained. However, conventional image generation systems for image compositing include manual steps such as background and foreground selection, masking, refinement, placement, scale-adjustment, and harmonization. As a result, these systems are not friendly to users who are not image editing professionals.

In some examples, image compositing systems use generative adversarial networks (GANs) and spatial transformer networks (STNs). However, GANs are difficult to train and are not easily scalable. In some cases, a separate model is trained for each class. As a result, these systems cannot be scaled to large models and large number of classes. Furthermore, multi-head self-attention is used to train models for layout generation and completion. For example, an image can be represented as a set of layout elements by extracting class and bounding box information of the overall scene and objects of the image. However, these layouts are generated by exclusively attending to left context and conventional models cannot see the whole scene at once. Therefore, conventional systems are not able to perform object insertion within an image with appropriate position, scale, harmony, etc.

Embodiments of the present disclosure provide a neural network trained to generate a composite image comprising a target object at the appropriate position and scale within an image. That is, the inventive concept involves a sequential encoder used to determine different pieces of information sequentially, e.g., classification of the new object, x coordinate, y coordinate, height, and width. Therefore, embodiments of the present disclosure enable an inserted object to be placed and scaled appropriately within the image. An image generation apparatus of the present disclosure is scalable to a large number of classes and can generate a more complex image. Image generation quality is increased accordingly.

According to some embodiments, the image generation apparatus receives an image depicting an object. A sequence generation component of the image generation apparatus generates a sequence of tokens including a set of tokens corresponding to the object and a set of mask tokens corresponding to a new object to be inserted into the image. A sequence encoder generates a placement token value for the set of mask tokens based on the sequence of tokens. The placement token value represents position information of the new object (e.g., coordinates, location, scale). The image generation apparatus inserts the new object into the image based on the position information.

In some examples, an object detection component of the image generation apparatus identifies a bounding box for each of existing objects of the image. The sequence generation component converts each identified bounding box into a flat sequence using raster scan order such that each bounding box is represented by a corresponding set of tokens. For example, tokens for a bounding box (i.e., an object of the image) includes a class token, x coordinate token, y coordinate token, width token, and a height token.

In some embodiments, the image generation apparatus includes a BERT network trained using self-supervised method for layout understanding. At training, the image generation apparatus considers the complete context at once and applies bi-directional attention for object insertion. In some examples, a bounding box corresponding to an object is randomly selected from the image. A set of tokens corresponding to the selected bounding box are masked (i.e., mask tokens). The sequential encoder is trained to predict a placement token value for each of the set of mask tokens iteratively.

Some embodiments of the disclosure include modeling likelihood of a large number of classes. In some examples, the image generation apparatus models hundreds of classes that a new object belongs to one of the classes. The image generation apparatus is trained using self-supervised masked language modeling objective implemented on a bi-directional transformer model. The image generation apparatus is scalable to diverse set of data domains such as complex scenes, documents, and design templates.

Embodiments of the present disclosure may be used in the context of image processing applications (e.g., object insertions, layout retrieval). For example, an image generation network based on the present disclosure may take an image and a query and efficiently insert an object mentioned in the query into the image. An example application of the inventive concept in the image generation context is provided with reference to FIGS. 1-3. Example processes for image generation are provided with reference to FIGS. 4-6. Details regarding the architecture of an example image generation apparatus are provided with reference to FIGS. 7-9. Example training processes are described with reference to FIGS. 10-12.

Image Generation

In FIGS. 1-6, a method, apparatus, and non-transitory computer readable medium for image generation are described. One or more embodiments of the method, apparatus, and non-transitory computer readable medium include receiving an image depicting an object; generating a sequence of tokens including a set of tokens corresponding to the object and a set of mask tokens corresponding to an additional object to be inserted into the image; generating a placement token value for the set of mask tokens based on the sequence of tokens using a sequence encoder, wherein the placement token value represents position information of the additional object; and inserting the additional object into the image based on the position information to obtain a composite image.

Some examples of the method, apparatus, and non-transitory computer readable medium further include identifying a bounding box corresponding to the object. Some examples further include generating one or more placement tokens representing position information of the object based on the bounding box, wherein the set of tokens includes the one or more placement tokens. In some examples, the one or more placement tokens include a width token and a height token.

Some examples of the method, apparatus, and non-transitory computer readable medium further include detecting a class of the object, wherein the set of tokens includes a class token representing the class.

Some examples of the method, apparatus, and non-transitory computer readable medium further include identifying a class token value for a class mask token of the set of mask tokens, wherein the placement token value is generated based on the class token value.

Some examples of the method, apparatus, and non-transitory computer readable medium further include identifying a semantic category of the additional object based on the class token value. Some examples further include selecting an additional object mask for the additional object based on the semantic category, wherein the additional object is inserted into the image based on the additional object mask.

Some examples of the method, apparatus, and non-transitory computer readable medium further include generating an additional placement token value for the set of mask tokens based on the placement token value.

Some examples of the method, apparatus, and non-transitory computer readable medium further include identifying a plurality of objects in the image, wherein the sequence of tokens includes a corresponding set of tokens for each of the plurality of objects.

Some examples of the method, apparatus, and non-transitory computer readable medium further include generating a scene graph of the image, wherein the plurality of objects is identified based on the scene graph.

Some examples of the method, apparatus, and non-transitory computer readable medium further include generating an alternate sequence of tokens including the set of tokens corresponding to the object and the set of mask tokens at a different location than the set of mask tokens in the sequence of tokens. Some examples further include generating a first likelihood score for the sequence of tokens and a second likelihood score for the alternate sequence of tokens, wherein the additional object is inserted based on the first likelihood score and the second likelihood score.

Some examples of the method, apparatus, and non-transitory computer readable medium further include identifying coordinates for the additional object based on the placement token value, wherein the additional object is inserted at the identified coordinates.

Some examples of the method, apparatus, and non-transitory computer readable medium further include identifying scale of the additional object based on the placement token value, wherein the additional object is inserted at the identified scale.

Some examples of the method, apparatus, and non-transitory computer readable medium further include dividing the image into a grid. Some examples further include assigning a unique value to each element of the grid, wherein the placement token value corresponds to the unique value of an element of the grid.

FIG. 1 shows an example of image generation according to aspects of the present disclosure. In some examples, these operations are performed by a system including a processor executing a set of codes to control functional elements of an apparatus. For example, the method may be performed by user 700 interacting with image generation apparatus 710 via user device 705 as described with reference to FIG. 7. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 105, a user provides an image and a query. In some cases, the operations of this step refer to, or may be performed by, user as described with reference to FIG. 7. In some cases, the user (e.g., a creator or designer) starts with a blank canvas, initializes the work with a base or background image, and adds parts from multiple images while applying geometric and color transformations (i.e., edits) until the target image is obtained (i.e., desired creation). In some examples, the target product can be a personal family collage, an advertisement photo, a sci-fi movie poster, a petting zoo fundraiser flyer, etc. As an example illustrated in FIG. 1, the natural language query from the user is "insert a chair". The original image depicts one or more existing objects such as a chair, floor, wall, etc.

At operation 110, the system identifies a target object from the query. In some cases, the operations of this step refer to, or may be performed by, image generation apparatus as described with reference to FIGS. 7 and 8. In the above example, the target object to be inserted into the image is identified from the query. The target object is "chair".

At operation 115, the system inserts the target object into the image. In some cases, the operations of this step refer to, or may be performed by, image generation apparatus as described with reference to FIGS. 7 and 8. In some embodiments, the system includes a bi-directional likelihood-based network configured to learn the most likely location and scale (i.e., position information) for an additional object to be inserted into an image. In the above example, the system predicts the position information and scale information for the additional object "chair" from the query based on the image. In some cases, the system is configured to automate photo-realistic and template-like object insertion conditioned on a desired class. In some examples, class information is given by user. In some examples, class information is not given and the system predicts a most likely class for an additional object to be inserted. This may correspond to a scenario where a query says, "insert a suitable object into this image", where the query does not indicate a class for the object to be inserted. Detail regarding the network architecture of the system is further described in FIGS. 7-9.

At operation 120, the system provides a composite image to the user. In some cases, the operations of this step refer to, or may be performed by, image generation apparatus as described with reference to FIGS. 7 and 8. The composite image includes the additional object "chair". The user may select the composite image for a next step (e.g., inserting another object into the composite image).

Figure 2:
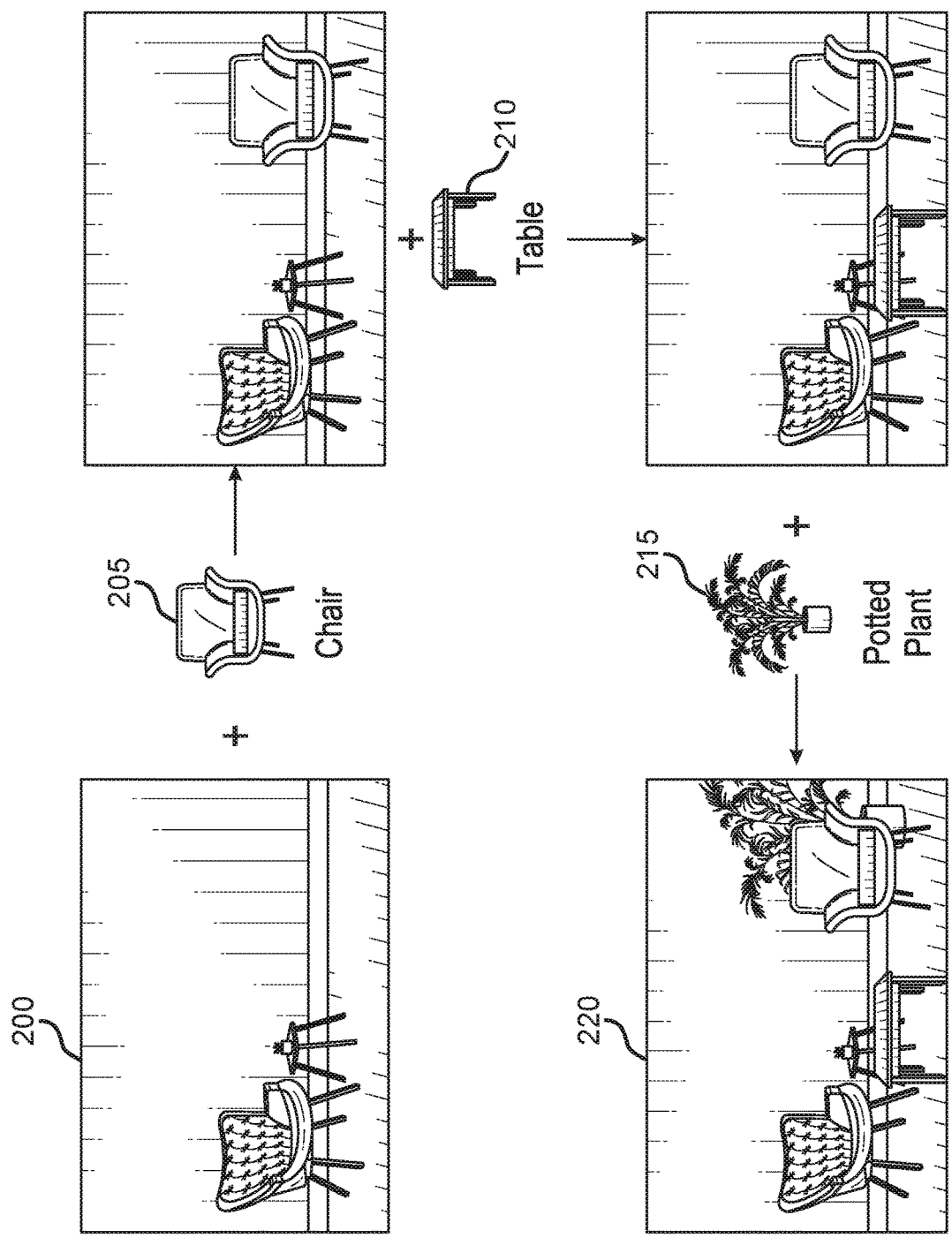
FIG. 2 shows an example of inserting multiple objects to an image according to aspects of the present disclosure.
Figure 7:
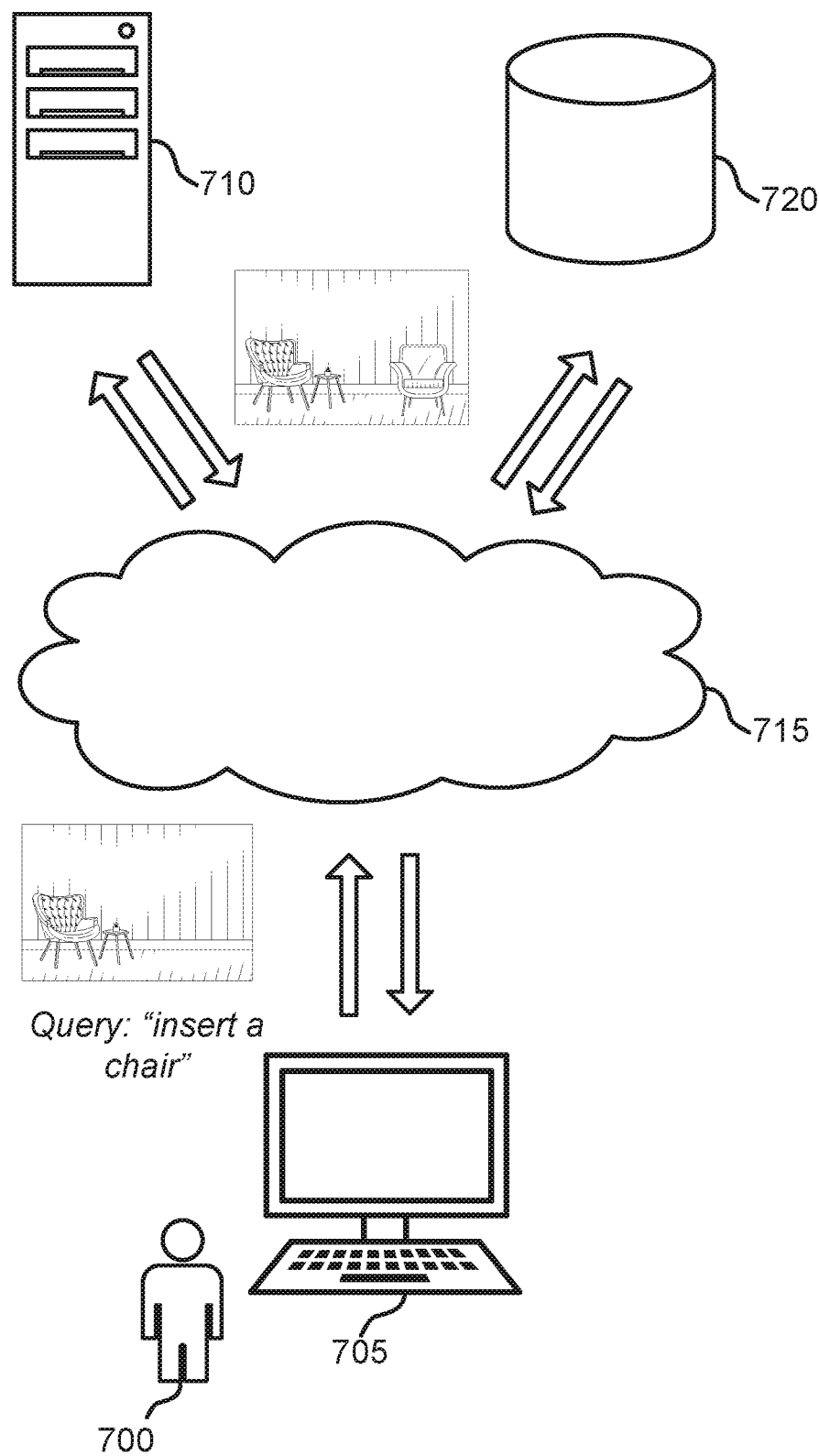
FIG. 7 shows an example of image generation system according to aspects of the present disclosure.

FIG. 2 shows an example of inserting multiple objects to an image according to aspects of the present disclosure. Image generation apparatus 710 as shown in FIG. 7 receives an image and a new object as input and generates a composite image based on the image and the new object. The example shown includes image 200, first object 205, second object 210, third object 215, and composite image 220. First object 205 is a chair. Second object 210 is a table. Third object 215 is potted plant. FIG. 2 illustrates iterative class conditional compositing using bounding box predictions and alpha masking via the image generation apparatus (see FIGS. 7 and 8). At each step, object insertion orders are re-sorted based on bottom bounding box coordinates to avoid unrealistic occlusion. First object 205, second object 210, and third object 215 are inserted into image 200 to obtain composite image 220. Composite image 220 includes original objects in image 200 and additional objects (i.e., chair, table, and potted plant).

Image 200 is an example of, or includes aspects of, the corresponding element described with reference to FIGS. 5 and 11. Composite image 220 is an example of, or includes aspects of, the corresponding element described with reference to FIG. 3.

Figure 3:
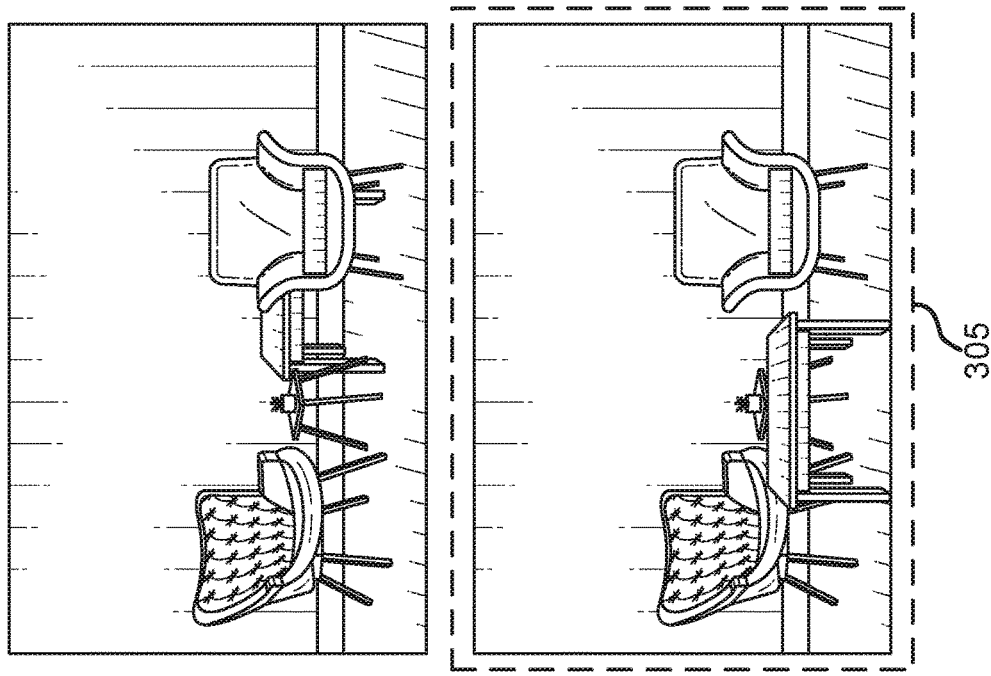
FIG. 3 shows an example of inserting an object at different locations according to aspects of the present disclosure.
Figure 3:
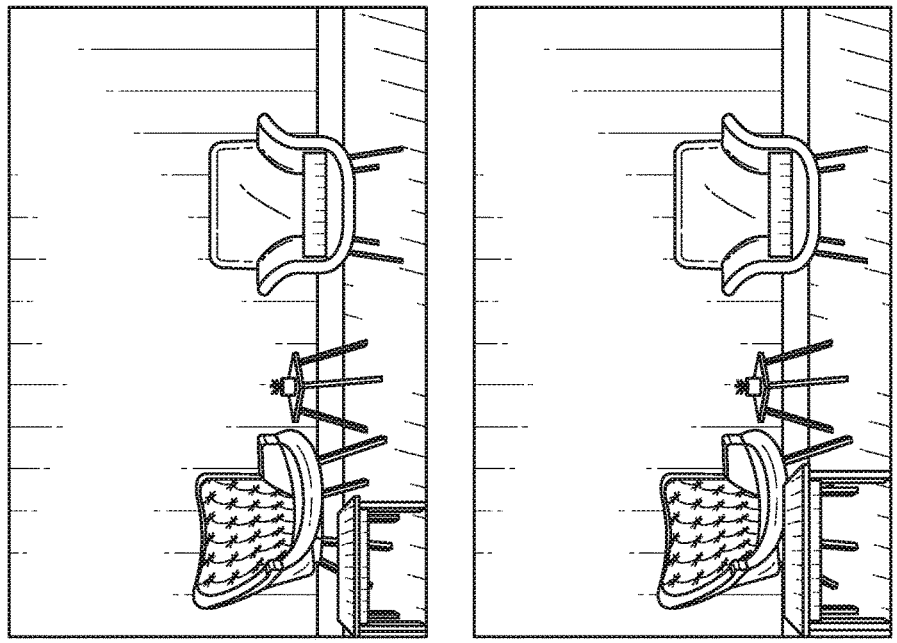
Figure 3:
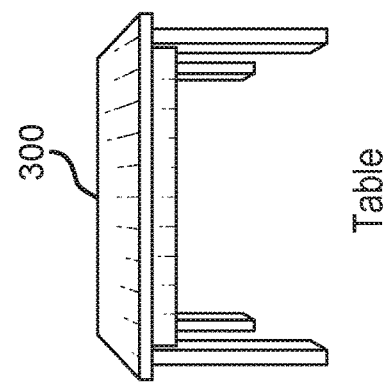

FIG. 3 shows an example of inserting an object at different locations according to aspects of the present disclosure. Image generation apparatus 710 inserts a new object into an image to obtain composite image 305. User 700 as shown in FIG. 7 selects composite image 305 for subsequent image editing. The example shown includes object 300 and composite image 305. In some examples, the image generation apparatus can extract the layout of the background image using panoptic segmentation. In some examples, image bounding box layout of an image can be extracted using a pre-trained panoptic segmentation model. Then the image generation apparatus performs composite recommendations conditioned on "table" class (i.e., class of the additional object is known or given). The additional object "table" may be inserted into different locations of an original image based on the scene and arrangement of objects in the original image. The size of the additional object "table" is adjusted to fit with existing objects in the image. For example, for the top left image (i.e., first image of the first row), a smaller table is placed at the bottom left of the image. The composite image 305 includes a table positioned in between the two chairs. The table has a relatively large size compared to other composite images. That is, the image generation apparatus 710 can predict position and scale information of the additional object to be inserted. The scale of the additional object (e.g., table) is determined to fit with the scene of the original image. A user selects composite image 305 for a next step (e.g., inserting another object into composite image 305). Composite image 305 is an example of, or includes aspects of, the corresponding element described with reference to FIG. 2.

Figure 4:
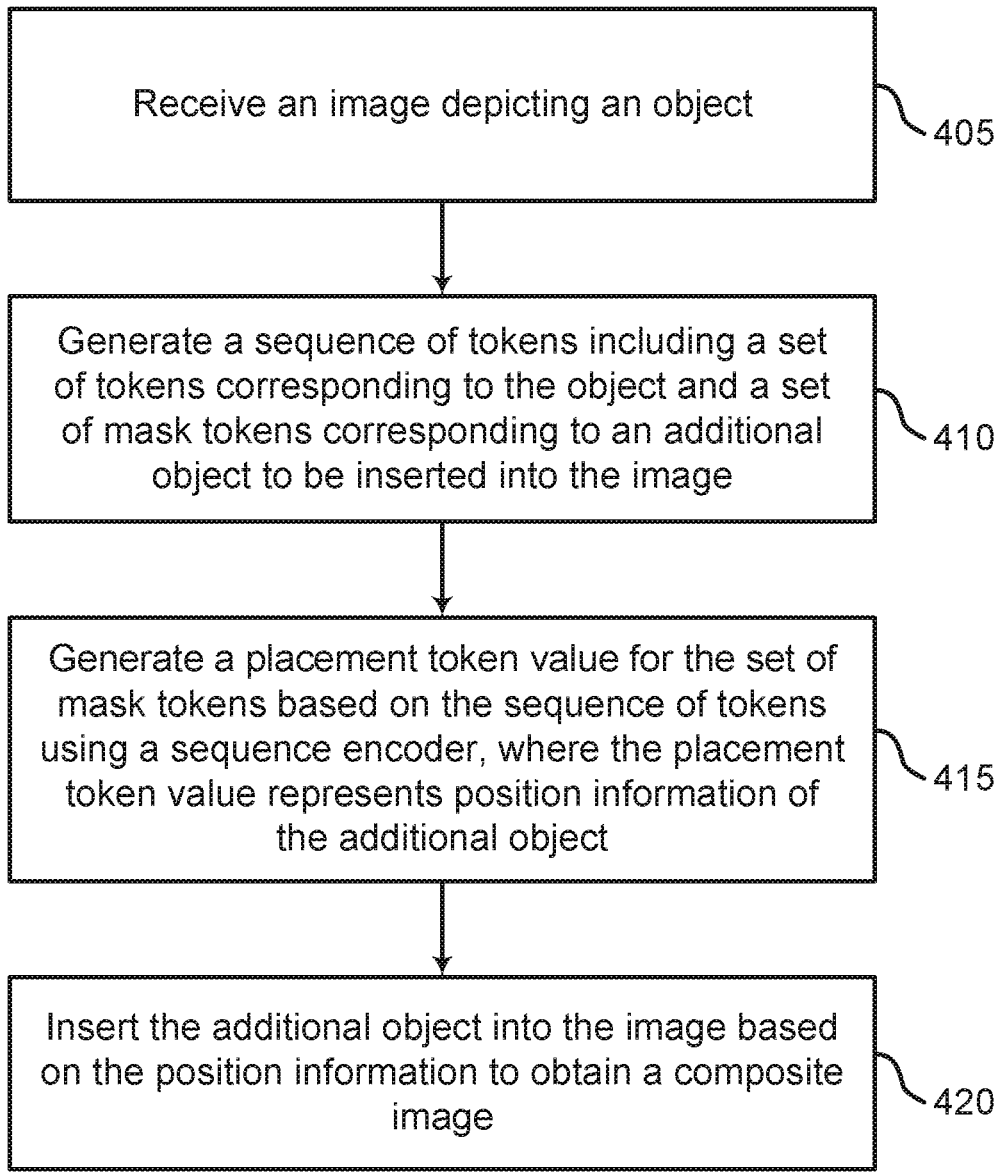
FIG. 4 shows an example of generating a composite image according to aspects of the present disclosure.

FIG. 4 shows an example of generating a composite image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system receives an image depicting an object. In some cases, the operations of this step refer to, or may be performed by, machine learning model as described with reference to FIG. 8. In some examples, an image includes one or more existing objects. An object detection component of the system is configured to detect class information and the position information of the object. The object detection component identifies a bounding box corresponding to the object. The sequence of tokens is generated based on the class information and the position information of the object.

At operation 410, the system generates a sequence of tokens including a set of tokens corresponding to the object and a set of mask tokens corresponding to an additional object to be inserted into the image. The operations of this step will be described in more detail in FIG. 5. In some cases, the operations of this step refer to, or may be performed by, sequence generation component as described with reference to FIGS. 5, 8, and 9. According to an embodiment, the system generates one or more placement tokens representing position information of the object based on the bounding box. The set of tokens includes the one or more placement tokens. The one or more placement tokens include a width token and a height token. The system detects a class of the object, wherein the set of tokens includes a class token representing the class. In some examples, the set of tokens corresponding to the object includes five tokens. That is, the set of tokens includes a class token, x coordinate token, y coordinate token, a width token, and a height token.

According to an embodiment, the set of mask tokens for the additional object (i.e., new object) includes five mask tokens. In some cases, a mask token is denoted by [mask] or <mask>. In some cases, the class token of the additional object is known or provided by a user. For example, the query says "insert a chair". Accordingly, "Chair" is identified as the class of the new object to be inserted into the image (i.e., class of the new object is given). In some cases, class of the new object is unknown, and the system predicts a most likely class for the new object based on the original image.

At operation 415, the system generates a placement token value for the set of mask tokens based on the sequence of tokens using a sequence encoder, where the placement token value represents position information of the additional object. The operations of this step will be described in more detail in FIG. 6. In some cases, the operations of this step refer to, or may be performed by, sequence encoder as described with reference to FIGS. 6, 8, and 9. According to an embodiment, the system generates an additional placement token value for the set of mask tokens based on the placement token value. That is, the system predicts a placement token value for each of the mask tokens iteratively (i.e., mask tokens corresponding to x, y, w and h). In some examples, the system predicts or un-masks the left-most token of the mask tokens at each step (i.e., predicts the left-most masked token). However, embodiments of the present disclosure are not limited to predict or un-mask the left-most token of the mask tokens at each step.

At operation 420, the system inserts the additional object into the image based on the position information to obtain a composite image. In some cases, the operations of this step refer to, or may be performed by, image generation component as described with reference to FIGS. 8 and 9. The system identifies coordinates for the additional object based on the placement token value. The additional object is inserted at the identified coordinates (e.g., x coordinate, y coordinate). Additionally, the system identifies scale of the additional object based on the placement token value (e.g., height token value, width token value). The additional object is inserted at the identified scale. According to an embodiment, a sequential encoder is used to determine different pieces of information sequentially, e.g., classification of the new object, x coordinate, y coordinate, height, and width, as describe in preceding operations. This enables the additional object to be placed and scaled appropriately within the image.

Figure 5:
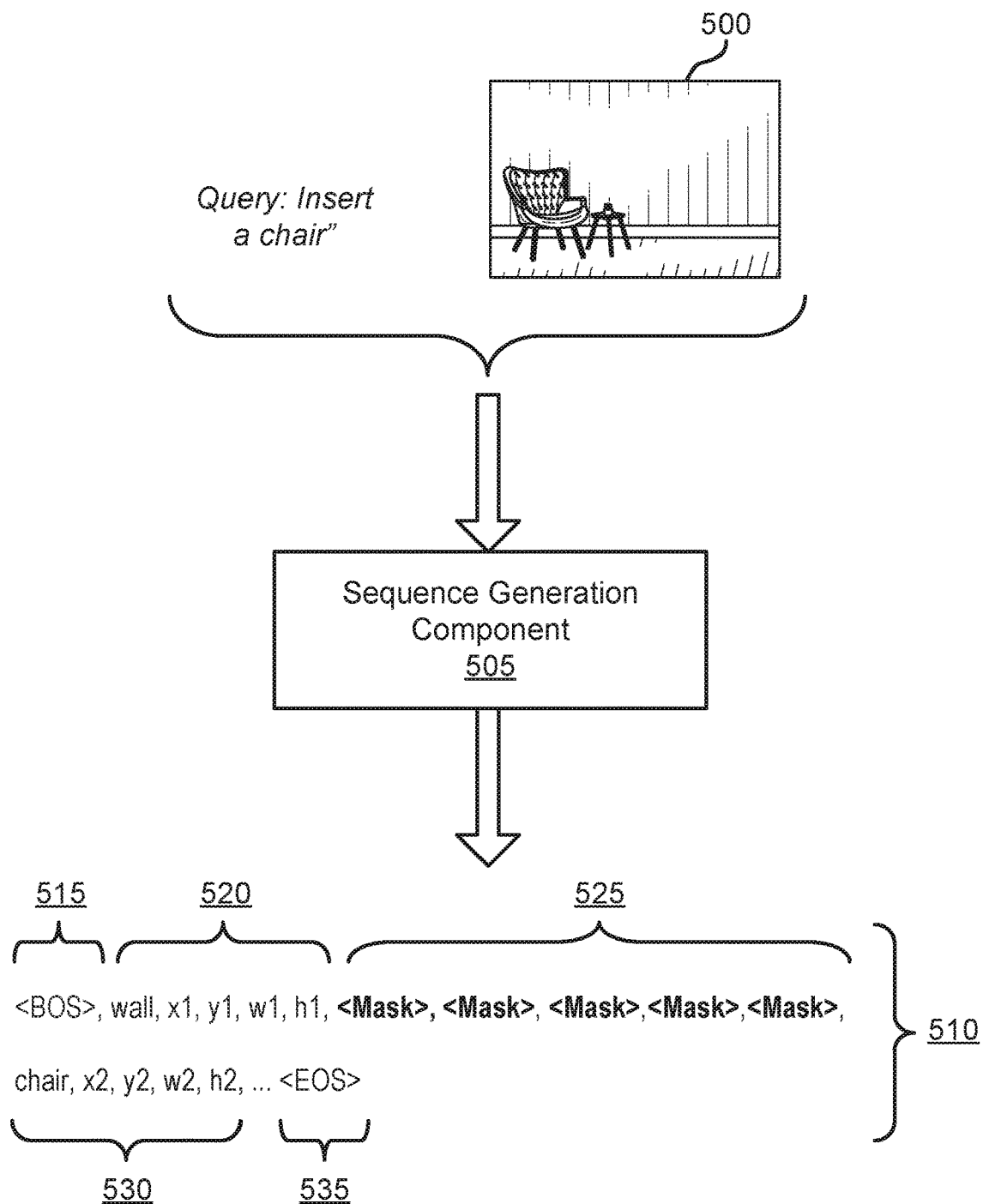
FIG. 5 shows an example of generating a sequence of tokens according to aspects of the present disclosure.

FIG. 5 shows an example of generating a sequence of tokens according to aspects of the present disclosure. FIG. 5 is a further illustration of operation 410 as shown in FIG. 4. The example shown includes image 500, sequence generation component 505, sequence of tokens 510, beginning of sentence (BOS) token 515, first object tokens 520, mask tokens 525, second object tokens 530, and end of sentence (EOS) token 535. Image 500 is an example of, or includes aspects of, the corresponding element described with reference to FIGS. 2 and 11.

According to some embodiments, sequence generation component 505 generates a sequence of tokens 510 including a set of tokens corresponding to an object of image 500 and a set of mask tokens 525 corresponding to an additional object to be inserted into image 500. In some examples, sequence generation component 505 generates one or more placement tokens representing position information of the object based on the bounding box, where the set of tokens includes the one or more placement tokens. In some examples, the one or more placement tokens include a width token and a height token.

In some examples, sequence generation component 505 generates an alternate sequence of tokens including the set of tokens corresponding to the object and the set of mask tokens 525 at a different location than the set of mask tokens 525 in the sequence of tokens 510. In some examples, sequence generation component 505 divides image 500 into a grid. In some examples, sequence generation component 505 assigns a unique value to each element of the grid, where the placement token value corresponds to the unique value of an element of the grid. Sequence generation component 505 is an example of, or includes aspects of, the corresponding element described with reference to FIGS. 8 and 9.

The image generation apparatus extracts bounding boxes and converts the bounding boxes into a flat sequence using raster scan order. A sequence input or sequence of tokens 510 is represented as BOS, $c_1$, $x_1$, $y_1$, $w_1$, $h_1$, $c_2$, $x_2$, $y_2$, $w_2$, $h_2$, ..., EOS, where c, x, y, w, h denote class token, top-left x coordinate token, top-left y coordinate token, width token and height token, respectively. In some examples, c denotes the class label id. Sequence elements are tokenized, and an embedding vector is learned during training for each individual token. For example, 133 classes are represented with 133 unique token ids. Bounding box coordinates (x1, y1, w, h) are tokenized after binning the continuous values by converting the 2D input into a H×W grid. Assume a bounding box corresponds an area inside 8×8 grid. x and y coordinates are binned equally in both directions starting from 0 to 7. In some examples, x1 corresponds to bin number 1 and y1 corresponds to bin number 2.

Height and width are also binned using the same grid. In some examples, bounding box has a width which corresponds to total of 4 bins and a height which corresponds to total of 3 bins. Final bounding box bin values correspond to (x1, y1, w, h): (1, 2, 4, 3). A unique index from the embedding lookup table is assigned for each token id, c, x1, y1, w and h. Special tokens like EOS, BOS, and padding are also assigned to unique indices. Raster order is applied to make use of positional embeddings and to order the bounding boxes in the input sequences.

Each class id is mapped to a unique class token during tokenization, and x, y, w, h tokens are mapped to discrete space by splitting the 2D input into a N×N grid. As an example, class of a first object is wall. Class of a second object is chair. Hence, c1 is set to wall and c2 is set to chair. Sequence of tokens 510 is an example of, or includes aspects of, the corresponding element described with reference to FIGS. 6, 11, and 12.

Beginning of sentence token 515 is an example of, or includes aspects of, the corresponding element described with reference to FIG. 6. End of sentence token 535 is an example of, or includes aspects of, the corresponding element described with reference to FIG. 6. In some examples, BOS and EOS are special tokens to denote beginning of sentence and end of sentence.

As the example sequence of tokens 510 illustrated in FIG. 5, the sequence of tokens 510 includes two objects. However, embodiments of the present disclosure are not limited to two objects. That is, image 500 can include more than two objects. Wall, x1, y1, w1, h1 are first object tokens 520 corresponding to the first object in image 500. First object tokens 520 include one or more placement tokens (i.e., x1, y1, w1, h1). The placement tokens represent position information of the object based on a bounding box corresponding to the object. Note w1 is a width token and h1 is a height token. First object tokens 520 is an example of, or includes aspects of, the corresponding element described with reference to FIG. 6. Chair, x2, y2, w2, h2 are second object tokens 530 corresponding to the second object in image 500. Second object tokens 530 is an example of, or includes aspects of, the corresponding element described with reference to FIG. 6.

According to an embodiment, mask tokens 525 can be inserted at multiple positions in sequence of tokens 510. Mask tokens 525 includes a set of five tokens, they are class token, top-left x coordinate token, top-left y coordinate token, width token, and height token, in an order from left to right. The image generation apparatus can generate x, y, w, h at every index in the sequence of tokens 510, so mask of 5 tokens (i.e., mask tokens 525) may be placed at any suitable location in the flat sequence. Then, all these predictions have likelihood scores associated with them. The image generation apparatus can rank and show the most likely ones based on the likelihood scores. For example, a sequence BOS, c, x, y, w, h, EOS has one bounding box, the possible mask insertions can be:

predict at position 1: BOS, [MASK], [MASK], [MASK], [MASK], [MASK], c, x, y, w, h, EOS)

predict at position 2: BOS, c, x, y, w, h, [MASK], [MASK], [MASK], [MASK], [MASK], EOS)

In this example, mask tokens can be placed at two positions in the sequence of tokens. In the example shown in FIG. 5, mask tokens 525 can be placed at at least four positions because there are at least two objects (i.e., two bounding boxes) in the sequence of tokens 510. The first token in mask tokens 525 represents a masked class token. According to an embodiment, the image generation apparatus identifies the most likely classes that can be inserted after a given partial sequence (i.e., class recommendation for an additional object to be inserted into image 500). Mask tokens 525 are an example of, or include aspects of, the corresponding elements described with reference to FIGS. 6 and 12.

Figure 6:
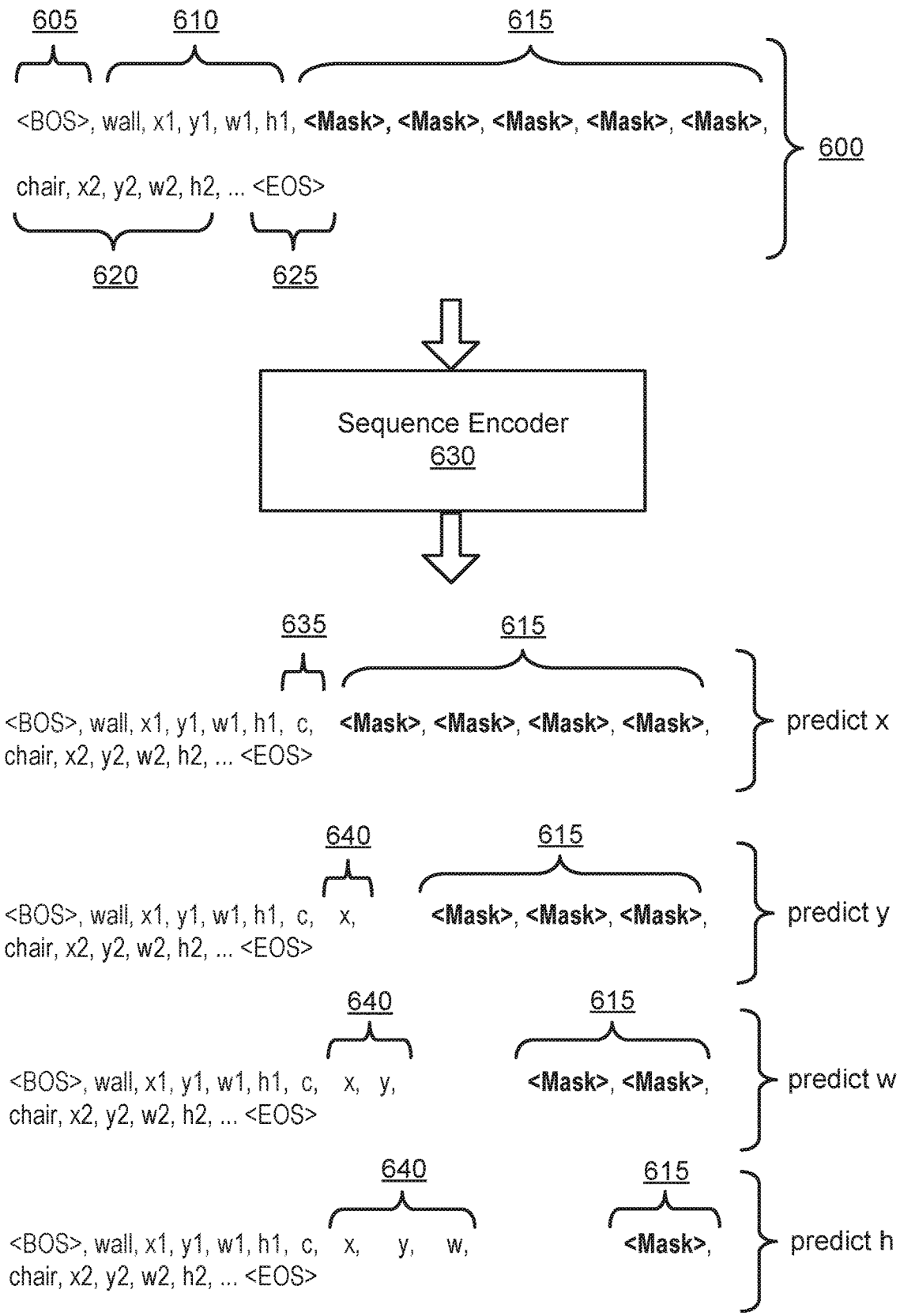
FIG. 6 shows an example of generating placement token values according to aspects of the present disclosure.

FIG. 6 shows an example of generating placement token values 640 according to aspects of the present disclosure. FIG. 6 is a further illustration of operation 415 as shown in FIG. 4. The example shown includes sequence of tokens 600, beginning of sentence token 605, first object tokens 610, mask tokens 615, second object tokens 620, end of sentence token 625, sequence encoder 630, class token value 635, and placement token values 640.

Sequence of tokens 600 includes a set of tokens corresponding to a first object (i.e., first object tokens 610) and a set of tokens corresponding to a second object (i.e., second object tokens 620). For example, first object tokens 610 "wall, x1, y1, w1, h1" are tokens corresponding to the first object. "Wall" is a class token value, x1 is x coordinate token, y1 is y coordinate token, w1 is width token (width of the bounding box), and h1 is height token (height of the bounding box), respectively.

Second object tokens 620 "chair, x2, y2, w2, h2" are tokens corresponding to the second object. "Chair" is a class token value for the second object, x2 is x coordinate token, y2 is y coordinate token, w2 is a width token and h2 is a height token, respectively. Sequence of tokens 600 is an example of, or includes aspects of, the corresponding element described with reference to FIGS. 5, 11, and 12. First object tokens 610 is an example of, or includes aspects of, the corresponding element described with reference to FIG. 5. Second object tokens 620 is an example of, or includes aspects of, the corresponding element described with reference to FIG. 5.

Beginning of sentence token 605 is an example of, or includes aspects of, the corresponding element described with reference to FIG. 5. BOS is the beginning of sentence token 605. End of sentence token 625 is an example of, or includes aspects of, the corresponding element described with reference to FIG. 5. EOS is the end of sentence token 625. In some cases, BOS may also be referred to as beginning of sequence. EOS may be referred to as end of sequence.

Mask tokens 615 correspond to an additional object to be inserted in an image. Mask tokens 615 is an example of, or includes aspects of, the corresponding element described with reference to FIGS. 5 and 12.

According to some embodiments, sequence encoder 630 generates a placement token value for the set of mask tokens 615 based on the sequence of tokens 600 using a sequence encoder 630, where the placement token value represents position information of the additional object. In some examples, sequence encoder 630 identifies a class token value 635 for a class mask token of the set of mask tokens 615, where the placement token value is generated based on the class token value 635. In some examples, sequence encoder 630 identifies a semantic category of the additional object based on the class token value 635. In some examples, sequence encoder 630 selects an additional object mask for the additional object based on the semantic category, where the additional object is inserted into the image based on the additional object mask. In some examples, sequence encoder 630 generates an additional placement token value for the set of mask tokens 615 based on the placement token value. In some examples, sequence encoder 630 generates a first likelihood score for the sequence of tokens 600 and a second likelihood score for the alternate sequence of tokens, where the additional object is inserted based on the first likelihood score and the second likelihood score. The alternate sequence of tokens includes the set of tokens corresponding to the object and the set of mask tokens at a different location than the set of mask tokens in the sequence of tokens 600.

According to some embodiments, sequence encoder 630 generates a placement token value for the set of mask tokens 615 based on the sequence of tokens 600, where the placement token value represents position information of the additional object. In some examples, sequence encoder 630 generates a class token value 635 for the set of mask tokens 615 based on the sequence of tokens 600. Sequence encoder 630 is an example of, or includes aspects of, the corresponding element described with reference to FIGS. 8 and 9.

According to an embodiment, the image generation apparatus (e.g., via custom masked language model objective) enables bounding box generation given a layout sequence such as sequence of tokens 600. In some examples, the image generation apparatus can predict the most likely class, location and scale of an additional object to be inserted into an image (e.g., image 500). The image generation apparatus is configured to attend to all the bounding boxes in the scene of image 500 at once. In some examples, the image generation apparatus includes a custom masked language model.

According to an embodiment, the image generation apparatus makes class recommendations with regards to which foreground objects are more likely to be inserted into a given image, document, or template. In some cases, the input sequence (i.e., sequence of tokens 600) is input to the image generation network to obtain output probabilities at each token (i.e., the most likely predictions for the next token). For example, 5 sequential mask tokens 615 may be inserted in each possible sequence location to obtain output probabilities for the masked class token.

In some examples, the target class to be inserted is known, either provided or recommended by the image generation network, and the probability outputs at each token are used to identify the most likely sequence of locations to insert the class token for bounding box generation.

In some examples, the output probabilities for the masked class tokens are used to identify the most likely classes that can be inserted after a given partial sequence. Additionally, the output probabilities for the masked class tokens may be used for class-conditional bounding box generation. According to an embodiment, the image generation apparatus randomly selects a bounding box and masks its corresponding tokens <c, x1, y1, w1, h1>. In a single batch, sequentially masked tokens for the selected bounding box are included. At inference, the image generation apparatus inserts 5 sequential mask tokens and predict class label. If class label is given, the apparatus inserts class token plus 4 sequential mask tokens. Then, x, y, w, and h tokens are predicted iteratively by replacing their masks with their predictions.

As the example shown in FIG. 6, an input sequence BOS, c1, x1, y1, w1, h1, c2, x2, y2, w2, h2, EOS has two bounding boxes. Class conditional iterative bounding box generation at index position 1 is performed as follows:
predict x:
BOS, c1, x1, y1, w1, h1, c, [MASK], [MASK], [MASK], [MASK], c2, x2, y2, w2, h2, EOS
predict y:
BOS, c1, x1, y1, w1, h1, c, x, [MASK], [MASK], [MASK], c2, x2, y2, w2, h2, EOS
predict w:
BOS, c1, x1, y1, w1, h1, c, x, y, [MASK], [MASK], c2, x2, y2, w2, h2, EOS
predict h:
BOS, c1, x1, y1, w1, h1, c, x, y, w, [MASK], c2, x2, y2, w2, h2, EOS), where c1 is "wall" and c2 is "chair". These are objects identified from image 500. The final output from sequence encoder 630 is:
BOS, c1, x1, y1, w1, h1, c, x, y, w, h, c2, x2, y2, w2, h2, EOS That is, sequence encoder 630 predicts placement token values for the set of mask tokens 615 (i.e., x, y, w, h).

Sequence encoder 630 generates a class token value 635 for the set of mask tokens 615 based on the sequence of tokens 600. That is, the first mask token of mask tokens 615 is "c". In some examples, class token value 635 is given or provided from a user, i.e., "chair" object depicted in the query "insert a chair" (see FIG. 5).

Network Architecture

Figure 8:
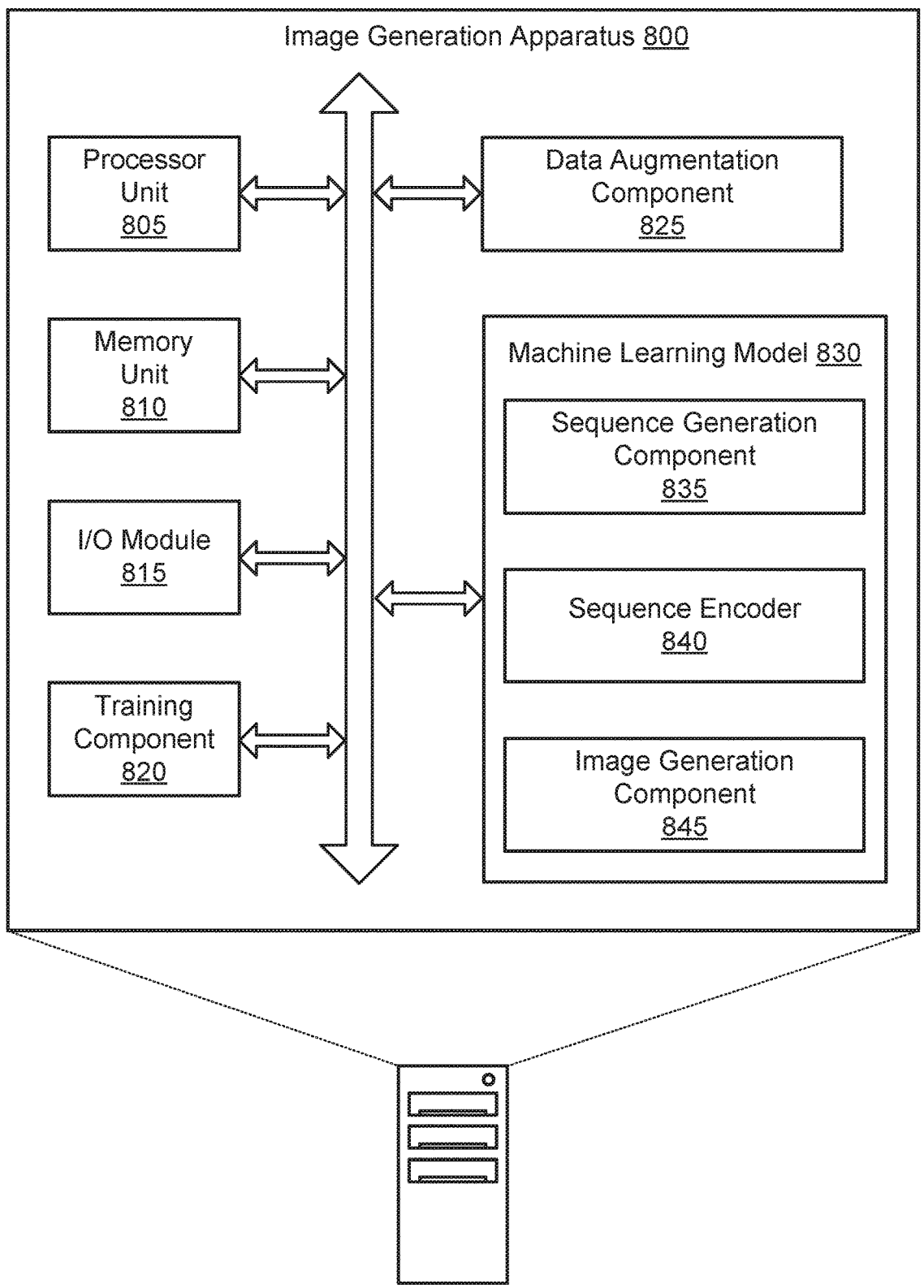
FIG. 8 shows an example of an image generation apparatus according to aspects of the present disclosure.
Figure 9:
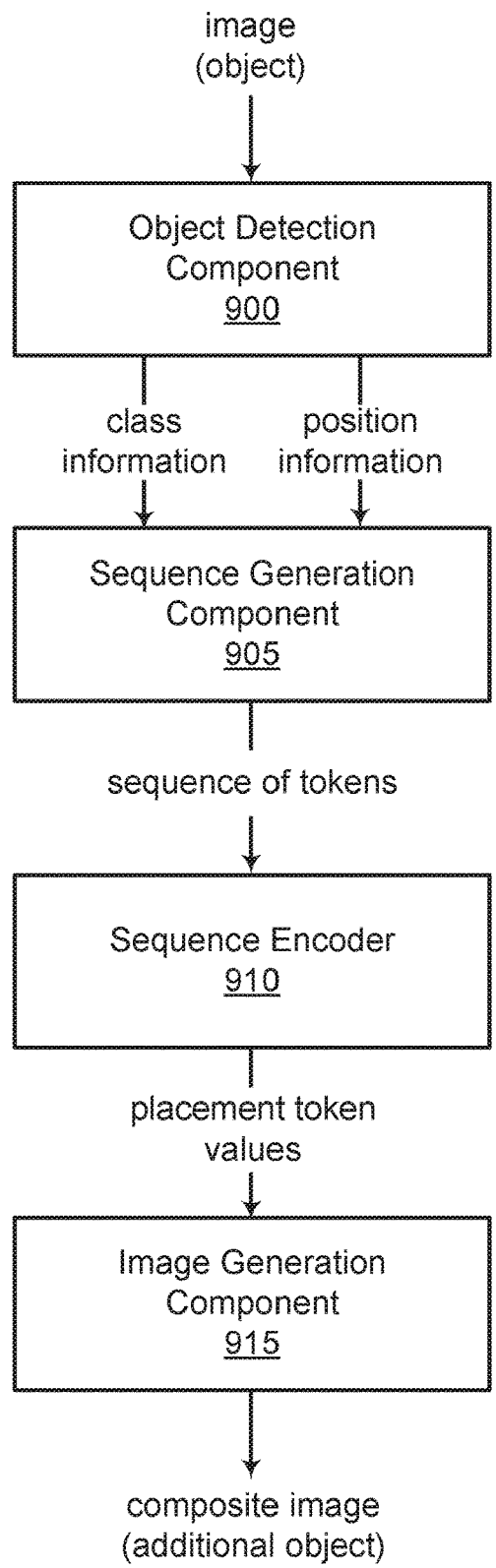
FIG. 9 shows an example of an image generation diagram according to aspects of the present disclosure.

In FIGS. 7-9, an apparatus and method for image generation are described. One or more embodiments of the apparatus and method include a sequence generation component configured to generate a sequence of tokens including a set of tokens corresponding to an object in an image and a set of mask tokens corresponding to an additional object to be inserted into the image; a sequence encoder configured to generate a placement token value for the set of mask tokens based on the sequence of tokens, wherein the placement token value represents position information of the additional object; and an image generation component configured to insert the additional object into the image based on the position information to obtain a composite image.

Some examples of the apparatus and method further include an object detection component configured to detect class information and the position information of the object, wherein the sequence of tokens is generated based on the class information and the position information of the object.

Some examples of the apparatus and method further include a training component configured to update parameters of the sequence encoder. Some examples of the apparatus and method further include a data augmentation component configured to generate training data based on annotated training images.

FIG. 7 shows an example of image generation system according to aspects of the present disclosure. The example shown includes user 700, user device 705, image generation apparatus 710, cloud 715, and database 720. Image generation apparatus 710 is an example of, or includes aspects of, the corresponding element described with reference to FIG. 8.

In an example of FIG. 7, user 700 provides an image and a query to image generation apparatus 710, e.g., via user device 705 and cloud 715. The example query includes a natural language input, that is "insert a chair". Image generation apparatus 710 identifies an additional object to be inserted based on the query for subsequent image composition. That is, the additional object "chair" is identified from the query and a chair is to be inserted into the image. Image generation apparatus 710 determines the position information and scale information for the additional object. Image generation apparatus 710 inserts a chair into the image based on the position information and scale information to obtain a composite image. The composite image includes the additional object "chair". Image generation apparatus 710 transmits the composite image to user 700, e.g., via user device 705 and cloud 715.

User device 705 may be a personal computer, laptop computer, mainframe computer, palmtop computer, personal assistant, mobile device, or any other suitable processing apparatus. In some examples, user device 705 includes software that incorporates an image processing application (e.g., an image editing application). In some examples, the image editing application on user device 705 may include functions of image generation apparatus 710.

A user interface may enable user 700 to interact with user device 705. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image generation apparatus 710 receives an image depicting an object; generates a sequence of tokens including a set of tokens corresponding to the object and a set of mask tokens corresponding to an additional object to be inserted into the image; generates a placement token value for the set of mask tokens based on the sequence of tokens using a sequence encoder, wherein the placement token value represents position information of the additional object; and inserts the additional object into the image based on the position information to obtain a composite image. Image generation apparatus 710 returns the composite image to user 700. The process of using image generation apparatus 710 is further described with reference to FIG. 1.

Image generation apparatus 710 includes a computer implemented network comprising a sequence generation component, sequence encoder, and an image generation component. Image generation apparatus 710 may also include a processor unit, a memory unit, an I/O module, a training component, and a data augmentation component. The training component is used to train a machine learning model (or an image generation network). Additionally, image generation apparatus 710 can communicate with database 720 via cloud 715. In some cases, the architecture of the image generation network is also referred to as a network or a network model. Further detail regarding the architecture of image generation apparatus 710 is provided with reference to FIGS. 7-9. Further detail regarding the operation of image generation apparatus 710 is provided with reference to FIGS. 4-6.

In some cases, image generation apparatus 710 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 715 is a computer network configured to provide on-demand availability of computer system resources, such as data storage and computing power. In some examples, cloud 715 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 715 is limited to a single organization. In other examples, cloud 715 is available to many organizations. In one example, cloud 715 includes a multi-layer communications network comprising multiple edge routers and core routers. In another example, cloud 715 is based on a local collection of switches in a single physical location.

Database 720 is an organized collection of data. For example, database 720 stores data in a specified format known as a schema. Database 720 may be structured as a single database, a distributed database, multiple distributed databases, or an emergency backup database. In some cases, a database controller may manage data storage and processing in database 720. In some cases, a user interacts with the database controller. In other cases, the database controller may operate automatically without user interaction.

FIG. 8 shows an example of an image generation apparatus according to aspects of the present disclosure. FIG. 8 is a further illustration of image generation apparatus 710 as shown in FIG. 7. FIG. 8 shows multiple sub-components of image generation apparatus 710. The example shown includes image generation apparatus 800, processor unit 805, memory unit 810, I/O module 815, training component 820, data augmentation component 825, and machine learning model 830. In some examples, machine learning model 830 includes sequence generation component 835, sequence encoder 840, and image generation component 845. Image generation apparatus 800 is an example of, or includes aspects of, the corresponding element described with reference to FIG. 7.

Processor unit 805 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 805 is configured to operate a memory array using a memory controller. In other cases, a memory controller is integrated into the processor. In some cases, processor unit 805 is configured to execute computer-readable instructions stored in a memory to perform various functions. In some embodiments, processor unit 805 includes special purpose components for modem processing, baseband processing, digital signal processing, or transmission processing.

Examples of memory unit 810 include random access memory (RAM), read-only memory (ROM), or a hard disk. Some examples of memory unit 810 include solid state memory and a hard disk drive. In some examples, memory unit 810 is used to store computer-readable, computer-executable software including instructions that, when executed, cause a processor to perform various functions described herein. In some cases, memory unit 810 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 810 store information in the form of a logical state.

I/O module 815 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 815 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. The communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image generation apparatus 800 includes a computer implemented artificial neural network (ANN) for image generation (e.g., object insertion). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image generation apparatus 800 includes a convolutional neural network (CNN) for image generation. CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 820 receives training data including an image depicting an object and ground truth information about an additional object. In some examples, training component 820 compares the placement token value with the ground truth information. Training component 820 updates parameters of the sequence encoder 840 based on the comparison of the placement token value with the ground truth information. In some examples, training component 820 compares the class token value with the ground truth information, where the parameters of the sequence encoder 840 are updated based on the comparison of the class token value with the ground truth information. In some examples, training component 820 identifies an original image including the object and the additional object. Training component 820 identifies the ground truth information based on the additional object in the original image, where the sequence of tokens is generated by masking a set of tokens corresponding to the additional object.

According to some embodiments, data augmentation component 825 is configured to generate training data based on annotated training images.

According to some embodiments, machine learning model 830 receives an image depicting an object. In some examples, machine learning model 830 generates a scene graph of the image, where the set of objects is identified based on the scene graph.

Sequence generation component 835 is an example of, or includes aspects of, the corresponding element described with reference to FIGS. 5 and 9. Sequence encoder 840 is an example of, or includes aspects of, the corresponding element described with reference to FIGS. 6 and 9.

According to some embodiments, image generation component 845 inserts the additional object into the image based on the position information to obtain a composite image. In some examples, image generation component 845 identifies coordinates for the additional object based on the placement token value, where the additional object is inserted at the identified coordinates. In some examples, image generation component 845 identifies scale of the additional object based on the placement token value, where the additional object is inserted at the identified scale. Image generation component 845 is an example of, or includes aspects of, the corresponding element described with reference to FIG. 9.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 9 shows an example of an image generation diagram according to aspects of the present disclosure. The image generation diagram includes several components of image generation apparatus 800 as shown in FIG. 8. The example shown includes object detection component 900, sequence generation component 905, sequence encoder 910, and image generation component 915.

According to some embodiments, an image depicting an object is input to object detection component 900. Object detection component 900 identifies a bounding box corresponding to an object of the image. In some examples, object detection component 900 detects a class of the object. A set of tokens corresponding to the object includes a class token representing the class of the object. In some examples, object detection component 900 identifies a set of objects in the image, where the sequence of tokens includes a corresponding set of tokens for each of the set of objects.

According to some embodiments, object detection component 900 is configured to detect class information and the position information of the object, wherein the sequence of tokens is generated based on the class information and the position information of the object.

The class information and position information are input to sequence generation component 905. Sequence generation component 905 generates a sequence of tokens including a set of tokens corresponding to the object and a set of mask tokens corresponding to an additional object to be inserted into the image. In some examples, the additional object (i.e., target object for insertion) is known and provided in a natural language query from a user. The query says "insert a chair". The "chair" is the additional object to be inserted. Sequence generation component 905 is an example of, or includes aspects of, the corresponding element described with reference to FIGS. 5 and 8.

Sequence encoder 910 generates a placement token value for the set of mask tokens based on the sequence of tokens using a sequence encoder, wherein the placement token value represents position information of the additional object. Sequence encoder 910 is an example of, or includes aspects of, the corresponding element described with reference to FIGS. 6 and 8.

Image generation component 915 inserts the additional object into the image based on the position information to obtain a composite image. The composite image includes the additional object. The user can insert another object into the composite image. Image generation component 915 is an example of, or includes aspects of, the corresponding element described with reference to FIG. 8.

Training and Evaluation

Figure 10:
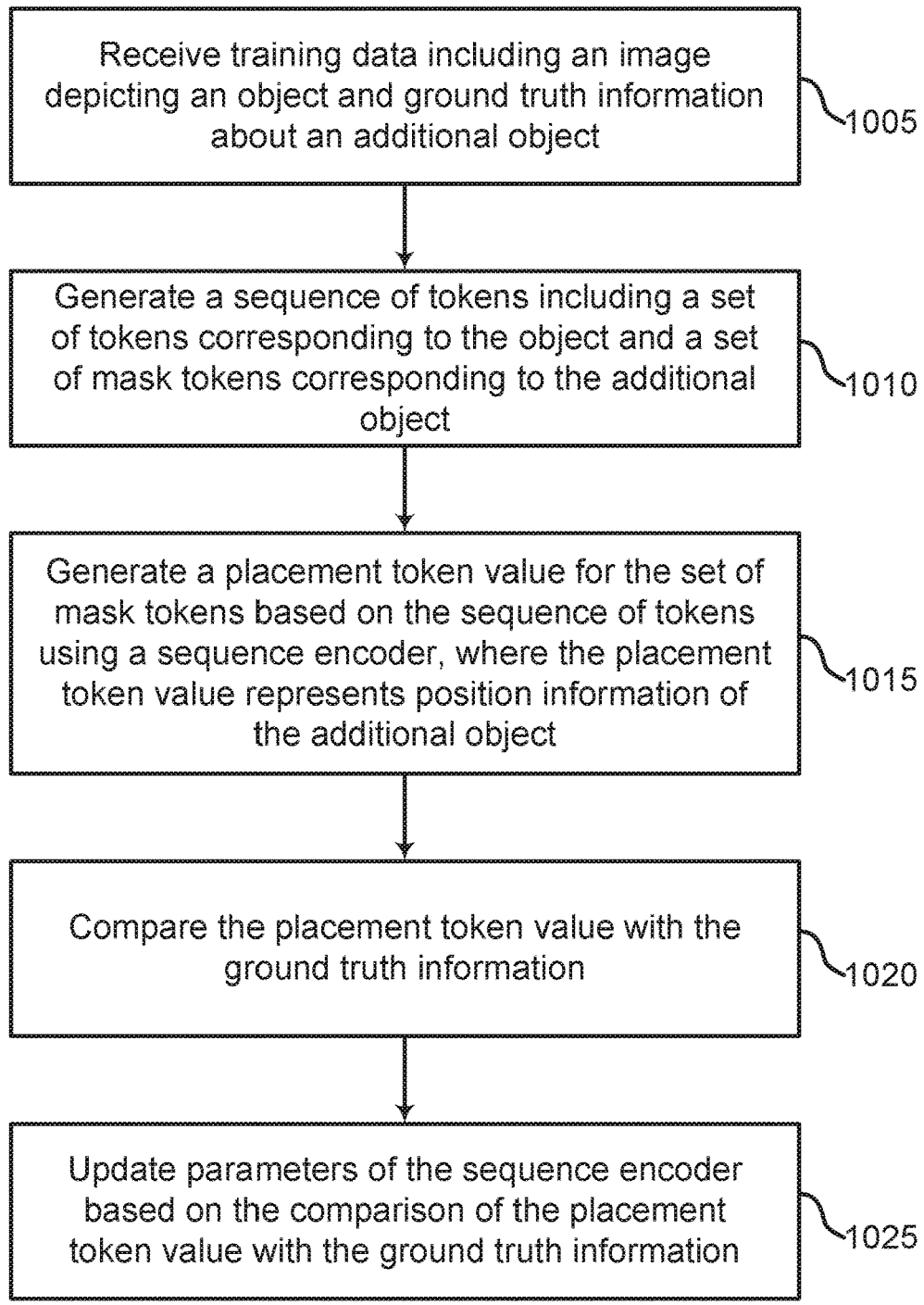
FIG. 10 shows an example of training a machine learning model according to aspects of the present disclosure.
Figure 11:
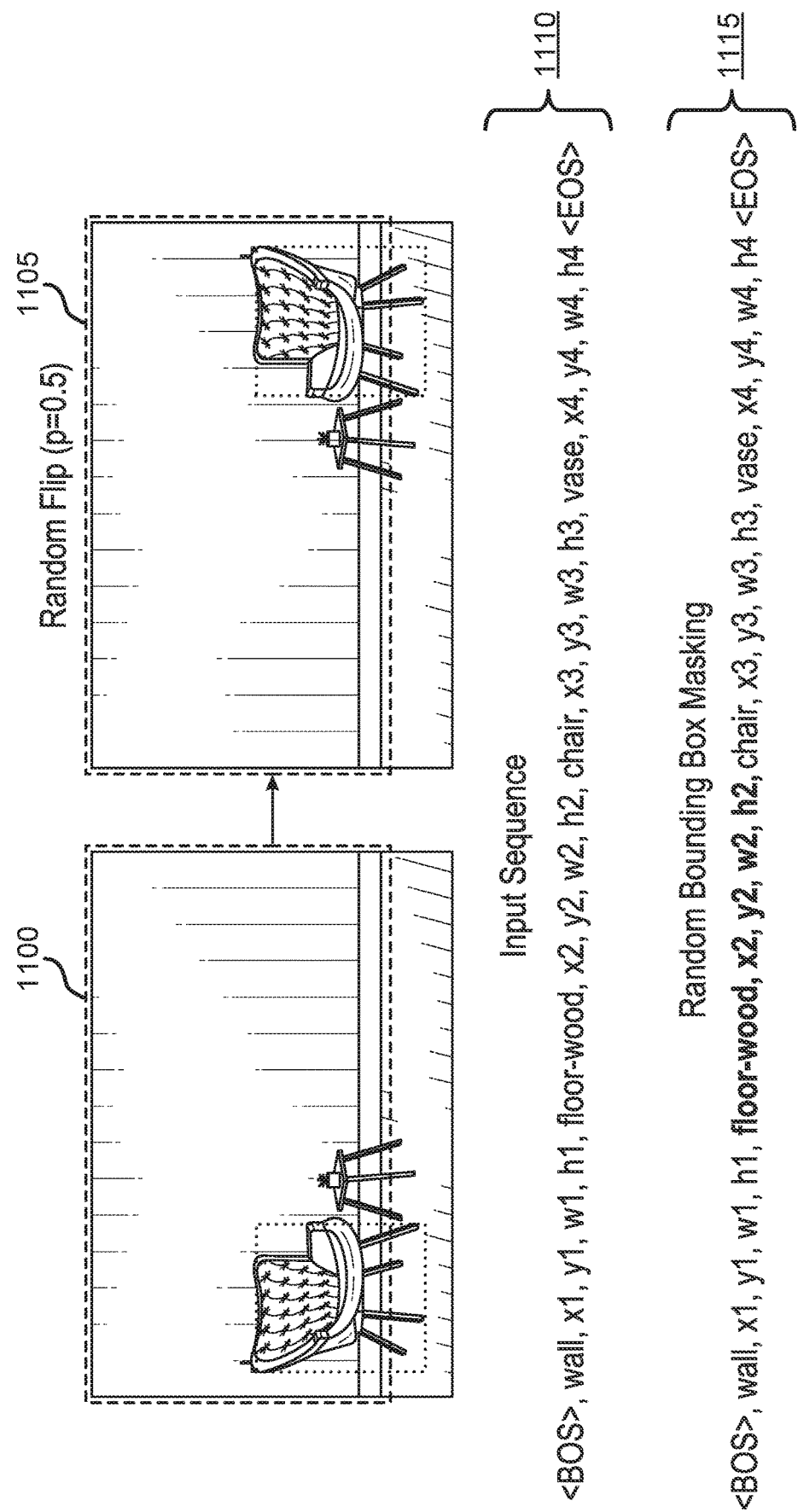
FIG. 11 shows an example of data augmentation according to aspects of the present disclosure.
Figure 12:
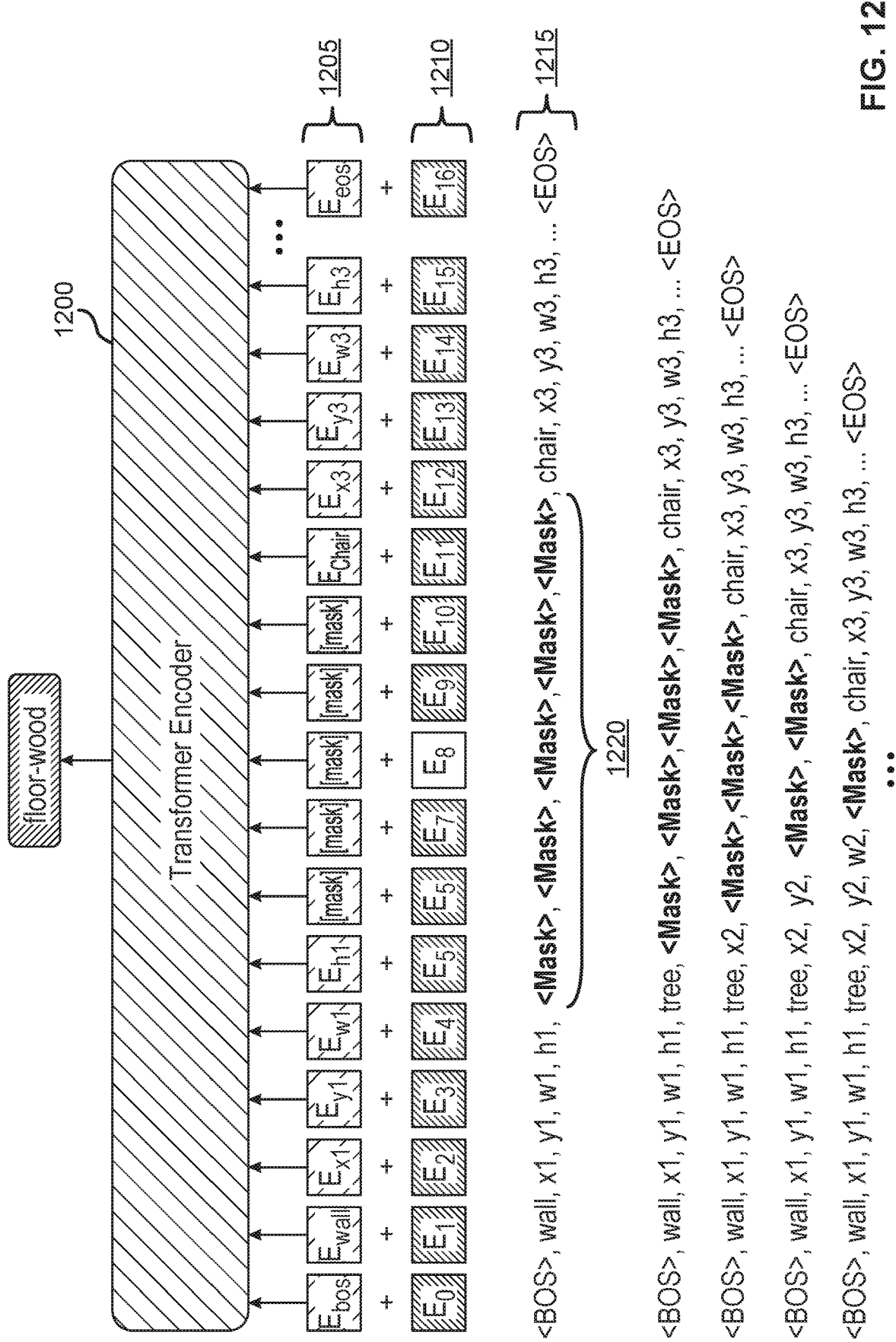
FIG. 12 shows an example of training a machine learning model to predict masked tokens iteratively according to aspects of the present disclosure.

In FIGS. 10-12, a method, apparatus, and non-transitory computer readable medium for training a neural network are described. One or more embodiments of the method, apparatus, and non-transitory computer readable medium include receiving training data including an image depicting an object and ground truth information about an additional object; generating a sequence of tokens including a set of tokens corresponding to the object and a set of mask tokens corresponding to the additional object; generating a placement token value for the set of mask tokens based on the sequence of tokens using a sequence encoder, wherein the placement token value represents position information of the additional object; comparing the placement token value with the ground truth information; and updating parameters of the sequence encoder based on the comparison of the placement token value with the ground truth information.

Some examples of the method, apparatus, and non-transitory computer readable medium further include generating a class token value for the set of mask tokens based on the sequence of tokens. Some examples further include comparing the class token value with the ground truth information, wherein the parameters of the sequence encoder are updated based on the comparison of the class token value with the ground truth information.

Some examples of the method, apparatus, and non-transitory computer readable medium further include identifying an original image including the object and the additional object. Some examples further include identifying the ground truth information based on the additional object in the original image, wherein the sequence of tokens is generated by masking a set of tokens corresponding to the additional object.

FIG. 10 shows an example of training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of machine learning model 830 (see FIG. 8) are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1005, the system receives training data including an image depicting an object and ground truth information about an additional object. In some cases, the operations of this step refer to, or may be performed by, training component as described with reference to FIG. 8.

In some examples, the training data includes COCO. COCO is a natural scene dataset with common objects that includes object class and stuff class annotations. For example, the object class contains a pre-defined set of 80 common objects and the stuff class contains 92 non-object annotations such as sky, wall, grass, and pavement. Stuff annotations and object annotations are used to understand the overall scene of an image and for object insertion. For example, the COCO Panoptic 2017 dataset includes 118,280 layouts in the training split and 5,000 layouts in the validation split. In some examples, annotated data includes 80 thing and 91 stuff classes.

PublayNet is a public large-scale dataset for document layout understanding. PublayNet includes 5 categories, i.e., text, title, figure, list, and table. In some examples, data preparation steps for PublayNet include removing layouts with more than 128 elements which results in 335,682 and 11,245 documents layouts for training and validation splits, respectively.

Image Layouts is a large-scale image dataset with 5.8 million stock images crawled from the web. Manually annotating such a large dataset is expensive and labor intensive. As a result, a pre-trained panoptic segmentation model is used to generate stuff and object class bounding box annotations. For example, 133 stuff and object classes can be generated.

Template Layouts dataset includes creative design templates such as posters, flyers, collages, social media posts, advertisements, etc. Template Layouts dataset has 45,000 templates and 2 classes image and text. The Image Layouts and Template Layouts datasets are curated for experimentation on large scale layout understanding in diverse domains.

At operation 1010, the system generates a sequence of tokens including a set of tokens corresponding to the object and a set of mask tokens corresponding to the additional object. In some cases, the operations of this step refer to, or may be performed by, sequence generation component as described with reference to FIGS. 5, 8, and 9.

According to an embodiment, when the target class to be inserted is known, either provided or recommended by the network model, the model probability outputs at each token are used to identify the most likely sequence of locations to insert the class token for bounding box generation. In some examples, beam search with top-k and top-p sampling with values k=15 and p=0.9 is used for generation with the custom layout GPT network. For generation with the custom layout BERT network, top-k sampling where k=3. The values of k and p can be modified to control the level of diversity in bounding box generation. The custom layout GPT network uses a causal mask and it exclusively attends to the previous tokens. Left-right flip is applied as a test time augmentation (TTA) to incorporate bi-directional context during generation.

In some examples, a sequence of tokens is:
  BOS, c, [MASK], [MASK], [MASK], [MASK], c, x, y, w, h, EOS The sequence of tokens includes tokens corresponding to an object, i.e., c, x, y, w, h. The sequence of tokens also includes a set of mask tokens corresponding to the additional object, i.e., c, [MASK], [MASK], [MASK], [MASK]. The class of the additional object is known or given (i.e., class is denoted as c.)

At operation 1015, the system generates a placement token value for the set of mask tokens based on the sequence of tokens using a sequence encoder, where the placement token value represents position information of the additional object. In some cases, the operations of this step refer to, or may be performed by, sequence encoder as described with reference to FIGS. 6, 8, and 9. Class conditional iterative bounding box generation at index position 1 can be performed as follows:
  predict x: BOS, c, [MASK], [MASK], [MASK], [MASK], c, x, y, w, h, EOS
  predict y: BOS, c, x, [MASK], [MASK], [MASK], c, x, y, w, h, EOS
  predict w: BOS, c, x, y, [MASK], [MASK], c, x, y, w, h, EOS
  predict h: BOS, c, x, y, w, [MASK], c, x, y, w, h, EOS
The final output from the sequence encoder is:
  BOS, c1, x1, y1, w1, h1, c, x, y, w, h, c2, x2, y2, w2, h2, EOS That is, the sequence encoder generates one or more placement token values for the set of mask tokens (i.e., x, y, w, h).

At operation 1020, the system compares the placement token value with the ground truth information. In some cases, the operations of this step refer to, or may be performed by, training component as described with reference to FIG. 8.

At operation 1025, the system updates parameters of the sequence encoder based on the comparison of the placement token value with the ground truth information. In some cases, the operations of this step refer to, or may be performed by, training component as described with reference to FIG. 8.

According to an embodiment, each bounding box generation has an associated output probability, where the probability indicates a score for predicted bounding box x, y, w, h. The score is used for ranking. A non-max suppression is applied on the bounding box generations to remove bounding boxes with low scores that include high overlap. The non-max suppression threshold is a controllable parameter similar to top-k and top-p. Alpha composition is applied to insert the additional object into the image after top scoring bounding boxes are obtained.

In some examples, a small-size model includes d=256, L=4, $n_{head}$=4, and $d_{ff}$=1024, a medium-size model consists of d=512, L=6, $n_{head}$=8, and $d_{ff}$=2048, and a large-size model consists of d=768, L=12, $n_{head}$=12, and $d_{ff}$=3072. A dropout of 0.1 is used at the end of each feed-forward layer for regularization and GELU activation. Adam optimizer is used with decoupled weight decay having an initial learning rate of 1e-3 using cosine annealing starting after completing 0.75 of training.

In some cases, training data is randomly subsampled in 20%, 60%, and 100% chunks. For example, 100% corresponds to 5.8 million layouts from the Image Layouts dataset. Each model is trained with an equal number of forward passes and backward updates. The same training schedule is implemented for fair comparison. For example, models with 100% of the training data are trained for 1.2 epochs, 60% of the training data are trained for 3 epochs and 20% of the training data are trained for 6 epochs. However, small and medium sized models may not be able to tolerate an increased number of samples as the large sized model. Additionally, the large model outperforms relatively small counterpart models. As a result, a large-scaled dataset is created for this task and the model capacity is increased. In some examples, the large-scale dataset with LayoutBERT-large shows a 3% improvement.

Performance of each class in the large-scale Image Layouts dataset is evaluated by plotting the NLL per class. In some cases, a positive correlation is found between class sample size and performance. For example, common stuff classes such as sky, wall, sea, tree, grass, and object classes such as person have low error rates, while rare classes such as toaster and parking meter have relatively high error rates.

FIG. 11 shows an example of data augmentation according to aspects of the present disclosure. The example shown includes image 1100, modified image 1105, sequence of tokens 1110, and modified sequence of tokens 1115.

In some examples, input sequences for training are created using bounding box annotations of raw images, documents, or templates dependent on the dataset. A pre-trained panoptic segmentation network is used to process images and an object detection network is used to process documents and templates during inference time or when bounding box annotations are not available.

According to an embodiment, the image generation network includes a BERT network optimized using a self-supervised training objective for layout understanding. The image generation network considers the complete context at once for generating bounding boxes for object insertion. Bi-directional attention is used for object insertion. In some examples, a bounding box is randomly selected during training and the image generation network masks the 5 tokens, i.e., c, x, y, w, h which represent the selected bounding box. The 5 tokens are referred to as mask tokens. For each sequence sample, the image generation network creates 5 duplicates and masks all 5 bounding box tokens c, x, y, w and h iteratively by un-masking the left-most token at each step. For each masked sequence, the image generation network predicts the left-most masked token. However, embodiments are not limited to un-masking the left-most token at each step.

The custom masked language modeling objective enables the image generation network to generate bounding boxes. In some cases, the bounding boxes can be generated by predicting c, x, y, w and h step by step while attending to other bounding boxes with bi-directional attention. A random left-right flip is applied as data augmentation on the 2D layout during training before converting the 2D layout into a flat input sequence. As an example illustrated in FIG. 11, modified image 1105 is a left-right flip of image 1100. Sequence of tokens 1110 include a first object, a second object, a third object, and a fourth object in an image. Tokens corresponding to the first object includes wall, x1, y1, w1, h1. Tokens corresponding to the second object includes floor-wood, x2, y2, w2, h2. Tokens corresponding to the third object includes chair, x3, y3, w3, h3. Tokens corresponding to the fourth object includes vase, x4, y4, w4, h4. During training, a bounding box is randomly selected and the image generation network masks the 5 tokens, i.e., c, x, y, w, h which represent the selected bounding box. Modified sequence of tokens 1115 is used to represent random bounding box masking. The selected bounding box corresponds to the second object is denoted in bold in FIG. 11, i.e., floor-wood, x2, y2, w2, h2.

According to an embodiment, the image generation apparatus includes a self-supervised masked language model that uses bidirectional multi-head self-attention. The image generation apparatus has increased model capacity. In some examples, the network model is trained for object insertion in the image compositing setting and other settings such as documents and design templates. In some cases, the learned representations can be used for layout-based retrieval tasks. In some examples, qualitative and quantitative evaluations are performed on datasets from diverse domains such as COCO, PublayNet, and custom datasets such as Image Layouts, and Template Layouts. For example, the Image Layouts dataset comprises 5.8 million images with layout annotations. An ablation study is conducted on the effect of dataset size, model size, and class sample size for the object insertion task. Results are recorded. Image 1100 is an example of, or includes aspects of, the corresponding element described with reference to FIGS. 2 and 5. Sequence of tokens 1110 is an example of, or includes aspects of, the corresponding element described with reference to FIGS. 5, 6, and 12.

FIG. 12 shows an example of training a machine learning model to predict masked tokens iteratively according to aspects of the present disclosure. Training component 820 of FIG. 8 is used to train the machine learning model. The example shown includes transformer encoder 1200, token embeddings 1205, position embeddings 1210, sequence of tokens 1215, and mask tokens 1220. According to an embodiment, the image generation network includes a BERT with bi-directional attention and the joint distribution is formulated as:

$$p(\theta_{1:\,n_i}) = \prod_{j=1}^{n_i} p(\theta_j \mid \theta_{1:\,j-1}, \theta_{j+5-i+1:\,n_i}) \quad (1)$$

where $n_i=5(n-1)+i$ is the $i^{th}$ element of the $n^{th}$ box. For example, i=1 for c, i=2 for x, i=3 for y, i=4 for w, and i=5 for h.

According to an embodiment, the image generation network is based on a bi-directional encoder representations from transformers (BERT) architecture. In some examples, BERT is used as a language representation model, and is configured to pre-train deep bi-directional representations from unlabeled text by jointly conditioning on both left and right context in all layers. As a result, the pre-trained BERT model can be finetuned with an additional output layer to create network models for specific tasks (e.g., question answering and language inference).

In some examples, BERT uses a masked language model (MLM or Masked LM) pre-training objective to alleviate the unidirectionality constraint. The masked language model randomly masks some of the tokens from the input, and the objective is to predict the original vocabulary id of the masked word based only on its context. Unlike left-to-right language model pre-training, the MLM objective enables the representation to fuse the left and the right context, which pretrains a deep bidirectional transformer. In addition to the masked language model, BERT includes a next sentence prediction (NSP) task that jointly pretrains text-pair representations.

A BERT model may also be applied to a recommendation task. A BERT recommendation network may learn based on a bidirectional model, while other sequential networks are limited to left-to-right unidirectional models which predict next item sequentially. For example, a two-layer transformer decoder (i.e., Transformer language model) may be used to capture user's sequential behaviors (i.e., for sequential recommendation). In some cases, a transformer model may be a unidirectional model using a casual attention mask.

According to an embodiment, the BERT recommendation network is stacked by L bi-directional transformer layers. At each layer, it iteratively revises the representation of every position by exchanging information across all positions at the previous layer in parallel with the transformer layer.

According to an embodiment, the transformer layer is not aware of the order of the input sequence. To make use of the sequential information of the input, the recommendation network injects positional embeddings into the input item embeddings at the bottoms of the transformer layer stacks. For a given item, its input representation is constructed by summing the corresponding token embeddings 1205 and position embeddings 1210. From input to output, transformer encoder 1200 includes embedding layer, transformer block, and output layer. Sequence of tokens 1215 include a set of tokens corresponding to an object of an image and mask tokens 1220 corresponding to an additional object for prediction and object insertion. For example, mask tokens 1220 are denoted by five <Mask>'s. In some examples, the embedding layer may include item embeddings and positional embeddings to embed the item id into a low-dimensional space.

According to an embodiment, a bounding box is selected for masking with uniform sampling and each token of the selected bounding box is masked iteratively and added to the batch. For each added sample, the image generation network predicts the left-most masked token. However, embodiments of the present disclosure are not limited to predict a left-most masked token of mask tokens 1220. In some examples, the image generation network predicts a token value for a class mask token of mask tokens 1220. The class mask token value is "tree" or a class id representing class "tree". Next, the image generation network predicts one or more placement token values for mask tokens 1220. The one or more placement token values represent position and scale information of the additional object. The image generation network predicts x2 corresponding to x coordinate token; y2 corresponding to y coordinate token; w2 corresponding to a width token. The last mask token value is to be determined in the next iteration. The last mask token value corresponds to a height token.

In some examples, the image generation apparatus considers image, document, or template layouts as scene graphs. The image generation apparatus is trained to perform object insertion using a masked language modeling (LM) objective. As a result, a bi-directional transformer model such as BERT is used. For example, the custom masked language modeling objective for layout understanding can be used with any transformer model or with a bi-directional LSTM, GRU, or RNN. A BERT network is trained using two tasks, i.e., masked language modeling (LM) and next sentence prediction (NSP). However, the masked LM and NSP tasks are not suitable for layout understanding and object insertion. Masked LM objective selects individual tokens to be masked during training. However, the image generation apparatus iteratively masks a set of tokens that corresponds to a bounding box identified from an image. Additionally, next sentence prediction is used for classifying whether a sentence comes after another given sentence and is not suitable for token generation in the context of the object insertion. In some examples, performance after removing the NSP loss increases downstream NLP task performance.

Sequence of tokens 1215 is an example of, or includes aspects of, the corresponding element described with reference to FIGS. 5, 6, and 11. Mask tokens 1220 is an example of, or includes aspects of, the corresponding element described with reference to FIGS. 5 and 6.

Performance of apparatus, systems and methods of the present disclosure have been evaluated, and results indicate embodiments of the present disclosure have obtained increased performance over existing technology. Example experiments demonstrate that the image generation apparatus outperforms conventional systems. In some example experiments, the image generation apparatus and methods of the present disclosure are evaluated on diverse datasets including natural scenes, documents, creative templates, and stock images.

Negative log-likelihood (NLL) is a metric used for layout generation tasks. In some cases, NLL is used for assessing the performance of the object insertion task because NLL can be considered as a proxy for class recommendation and bounding box generation accuracy. The image generation network of the present disclosure outperforms existing models across all datasets in terms of the NLL metric. In some examples, class and bounding box prediction performance correlates with NLL.

As for qualitative analysis, random samples are selected from the validation set of each dataset followed by identification of top-k classes to be inserted to each sample. Next, the bounding boxes are conditionally generated. In some examples, the most likely bounding box is inserted for the top-1 predicted class on PublayNet and Template Layouts datasets respectively, and one can visualize samples side-by-side before and after the object insertion. Alternatively, the top-5 classes for each sample are identified from COCO dataset and class conditional bounding boxes are generated with top-k sampling to show diverse results.

Each GPT feature at a given layer is calculated by exclusively attending to the previous tokens from the previous layer. In some embodiments, a custom layout GPT model extracts the last feature from the last hidden state to generate representations for a given layout. Some embodiments extract the average of all the features from the last hidden state to generate representations for a given layout. A BERT network uses bidirectional self-attention such that each feature can attend to every other feature from the previous layer. Hence, the average of the last hidden state is used to extract representations in the custom layout BERT model.

In some example experiments, retrieval performance of modified GPT network and the modified BERT network is compared based on COCO, PublayNet, and Layout Templates datasets. The cosine similarity is used to retrieve similar layouts and the results are reported on mAP@5. For a given query, the top 5 retrieved layouts are shown for assessment. The official validation set is used for retrieval evaluation for each dataset. In some examples, 1000 random samples are used as the query set and the remaining samples are used as the recall set. Each query is shown to 3 different experienced taskers for a final metric calculation. The final mAP@5 is calculated by taking the weighted average using tasker trust scores:

$$mAP@5 = \frac{1}{Q}\sum_{q=1}^{Q=1000}\sum_{n=1}^{3} AP_{qn} ts_n \qquad (2)$$

where Q is the total number of queries, $AP_{qn}$ is the average precision at 5 for query q calculated by tasker n, and $ts_n$ is the trust score for tasker n normalized to 1. Ease of job is rated by taskers on a scale of 1 to 5.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
    receiving an image depicting an object;
    identifying a bounding box corresponding to the object;
    generating one or more placement tokens representing position information of the object based on the bounding box;
    generating a sequence of tokens including a set of tokens corresponding to the object and a set of mask tokens corresponding to an additional object to be inserted into the image, wherein the set of tokens includes the one or more placement tokens;
    generating a placement token value for the set of mask tokens based on the sequence of tokens using a sequence encoder, wherein the placement token value represents position information of the additional object; and
    inserting the additional object into the image based on the position information of the additional object to obtain a composite image.

2. The method of claim 1, wherein:
    the one or more placement tokens include a width token and a height token.

3. The method of claim 1, further comprising:
    detecting a class of the object, wherein the set of tokens includes a class token representing the class.

4. The method of claim 1, further comprising:
    identifying a class token value for a class mask token of the set of mask tokens, wherein the placement token value is generated based on the class token value.

5. The method of claim 4, further comprising:
    identifying a semantic category of the additional object based on the class token value; and
    selecting an additional object mask for the additional object based on the semantic category, wherein the additional object is inserted into the image based on the additional object mask.

6. The method of claim 1, further comprising:
    generating an additional placement token value for the set of mask tokens based on the placement token value.

7. The method of claim 1, further comprising:
    identifying a plurality of objects in the image, wherein the sequence of tokens includes a corresponding set of tokens for each of the plurality of objects.

8. The method of claim 7, further comprising:
    generating a scene graph of the image, wherein the plurality of objects is identified based on the scene graph.

9. The method of claim 1, further comprising:
    generating an alternate sequence of tokens including the set of tokens corresponding to the object and the set of mask tokens at a different location than the set of mask tokens in the sequence of tokens; and
    generating a first likelihood score for the sequence of tokens and a second likelihood score for the alternate sequence of tokens, wherein the additional object is inserted based on the first likelihood score and the second likelihood score.

10. The method of claim 1, further comprising:
    identifying coordinates for the additional object based on the placement token value, wherein the additional object is inserted at the identified coordinates.

11. The method of claim 1, further comprising:
    identifying scale of the additional object based on the placement token value, wherein the additional object is inserted at the identified scale.

12. The method of claim 1, further comprising:
dividing the image into a grid; and
assigning a unique value to each element of the grid, wherein the placement token value corresponds to the unique value of an element of the grid.

13. An apparatus for image processing, comprising:
a sequence generation component configured to generate a sequence of tokens including a set of tokens corresponding to an object in an image and a set of mask tokens corresponding to an additional object to be inserted into the image;
an object detection component configured to detect class information and position information of the object, wherein the sequence of tokens is generated based on the class information and the position information of the object;
a sequence encoder configured to generate a placement token value for the set of mask tokens based on the sequence of tokens, wherein the placement token value represents position information of the additional object; and
an image generation component configured to insert the additional object into the image based on the position information of the additional object to obtain a composite image.

14. The apparatus of claim 13, further comprising:
a training component configured to update parameters of the sequence encoder.

15. The apparatus of claim 13, further comprising:
a data augmentation component configured to generate training data based on annotated training images.

16. A non-transitory computer readable medium storing code for image processing, the code comprising instructions executable by at least one processor to:
receive an image depicting an object;
generate a sequence of tokens including a set of tokens corresponding to the object and a set of mask tokens corresponding to an additional object to be inserted into the image;
identify a class token value for a class mask token of the set of mask tokens;
generate, using a sequence encoder, a placement token value for the set of mask tokens based on the sequence of tokens and the class token value, wherein the placement token value represents position information of the additional object; and
insert the additional object into the image based on the position information of the additional object to obtain a composite image.

17. The non-transitory computer readable medium of claim 16, the code further comprising instructions executable by the at least one processor to:
generate an alternate sequence of tokens including the set of tokens corresponding to the object and the set of mask tokens at a different location than the set of mask tokens in the sequence of tokens; and
generate a first likelihood score for the sequence of tokens and a second likelihood score for the alternate sequence of tokens, wherein the additional object is inserted based on the first likelihood score and the second likelihood score.

* * * * *